United States Patent
Hashimoto

(10) Patent No.: US 12,393,771 B2
(45) Date of Patent: Aug. 19, 2025

(54) STORAGE MEDIUM, INFORMATION PROCESSING APPARATUS, AND INFORMATION PROCESSING METHOD THAT DISPLAY LEFT AND RIGHT PAGE REGIONS OF A DOUBLE-PAGE ALBUM SPREAD

(71) Applicant: CANON KABUSHIKI KAISHA, Tokyo (JP)

(72) Inventor: Yoshinori Hashimoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 18/469,723

(22) Filed: Sep. 19, 2023

(65) Prior Publication Data

US 2024/0104296 A1    Mar. 28, 2024

(30) Foreign Application Priority Data

Sep. 27, 2022   (JP) .................................. 2022-154022

(51) Int. Cl.
| | |
|---|---|
| *G06F 40/166* | (2020.01) |
| *G06F 3/04812* | (2022.01) |
| *G06F 3/0482* | (2013.01) |
| *G06F 3/04845* | (2022.01) |
| *G06F 40/106* | (2020.01) |

(52) U.S. Cl.
CPC ........ *G06F 40/166* (2020.01); *G06F 3/04812* (2013.01); *G06F 3/0482* (2013.01); *G06F 3/04845* (2013.01); *G06F 40/106* (2020.01); *G06F 2203/04803* (2013.01)

(58) Field of Classification Search
CPC ............... G06F 3/04812; G06F 3/0482; G06F 3/04845; G06F 40/166; G06F 40/106
See application file for complete search history.

(56) References Cited

U.S. PATENT DOCUMENTS

| | | | |
|---|---|---|---|
| 8,660,381 B2* | 2/2014 | Fukuda | H04N 1/3875 382/284 |
| 9,288,339 B2* | 3/2016 | Kaneko | H04N 1/3875 |
| 10,534,505 B2* | 1/2020 | Ishida | G06F 3/0482 |
| 11,627,227 B2* | 4/2023 | Kunieda | H04N 1/00196 715/838 |

(Continued)

FOREIGN PATENT DOCUMENTS

| | | |
|---|---|---|
| JP | 2018-55533 A | 4/2018 |
| JP | 2021-27555 A | 2/2021 |

*Primary Examiner* — Tadesse Hailu
(74) *Attorney, Agent, or Firm* — Venable LLP

(57) ABSTRACT

An information processing method includes displaying a graphical user interface having a first region in which to arrange an object and a second region in which to display a list of an object that can be arranged in the first region, the first region being a region of a double-page album spread, the double-page spread region including a left page region and a right page region, and deriving a candidate region in which to arrange an object selected by a user in the first region, based on a state of arrangement of an object other than the selected object in the first region. The candidate region is displayed as a rectangular frame surrounded by a dashed line in the first region. In moving the selected object in the first region, the candidate region is switched and displayed based on a position of a cursor indicating the selected object.

14 Claims, 20 Drawing Sheets

(56) References Cited

U.S. PATENT DOCUMENTS

| | | |
|---|---|---|
| 11,695,891 B2 | 7/2023 | Hashimoto |
| 2003/0101237 A1* | 5/2003 | Ban .................... H04N 1/32128 |
| | | 709/218 |
| 2009/0142003 A1* | 6/2009 | Fukuda ................ H04N 1/3875 |
| | | 382/286 |
| 2011/0102858 A1* | 5/2011 | Iguchi .................... G06T 11/60 |
| | | 358/448 |
| 2012/0081364 A1* | 4/2012 | Yamaji .................... G06T 19/20 |
| | | 345/419 |
| 2012/0151332 A1* | 6/2012 | Kaneko .............. H04N 1/00196 |
| | | 715/253 |
| 2014/0208203 A1* | 7/2014 | Tang .................... G06F 40/106 |
| | | 715/252 |
| 2017/0039748 A1* | 2/2017 | Kunieda ................ G06T 11/60 |
| 2017/0187892 A1* | 6/2017 | Abe ....................... G06F 3/1208 |
| 2019/0102060 A1* | 4/2019 | Ishida .................. G06F 3/0483 |
| 2021/0012456 A1* | 1/2021 | Hashimoto .......... G06V 10/993 |
| 2021/0056254 A1* | 2/2021 | Kinoshita ............. G06F 3/0484 |
| 2021/0289081 A1* | 9/2021 | Yamada ............. H04N 1/00161 |
| 2022/0337722 A1* | 10/2022 | Hashimoto ......... G06F 3/04842 |

* cited by examiner

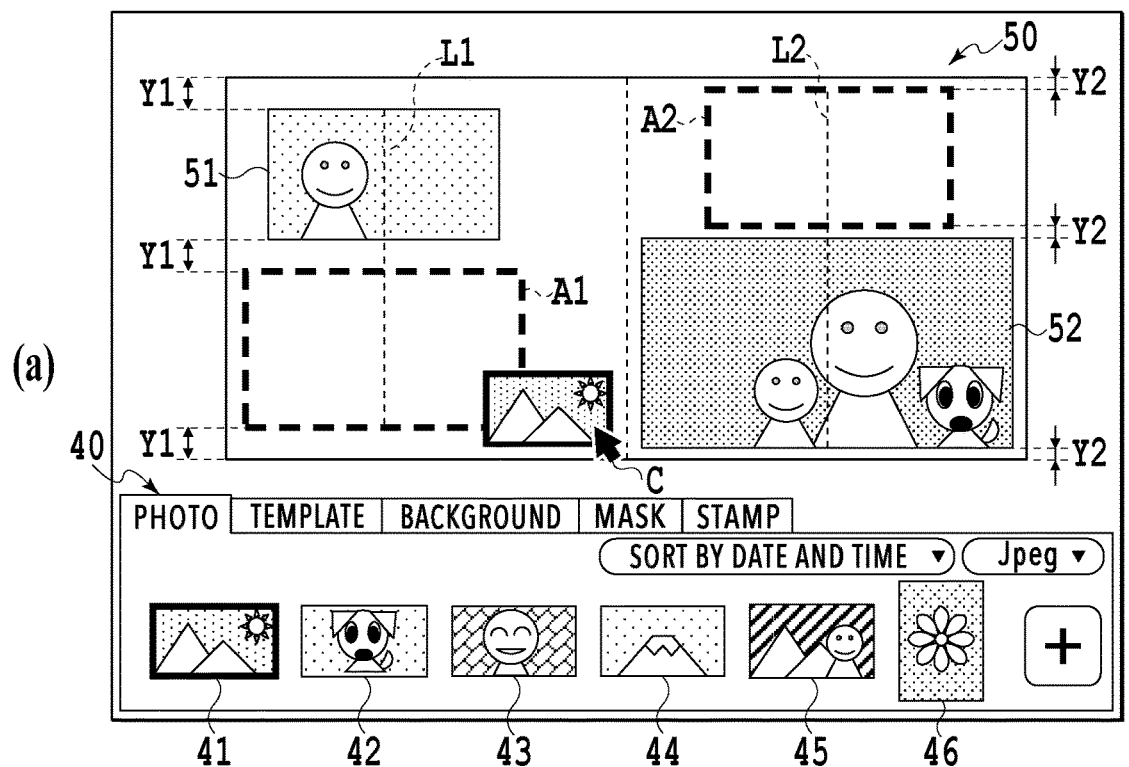
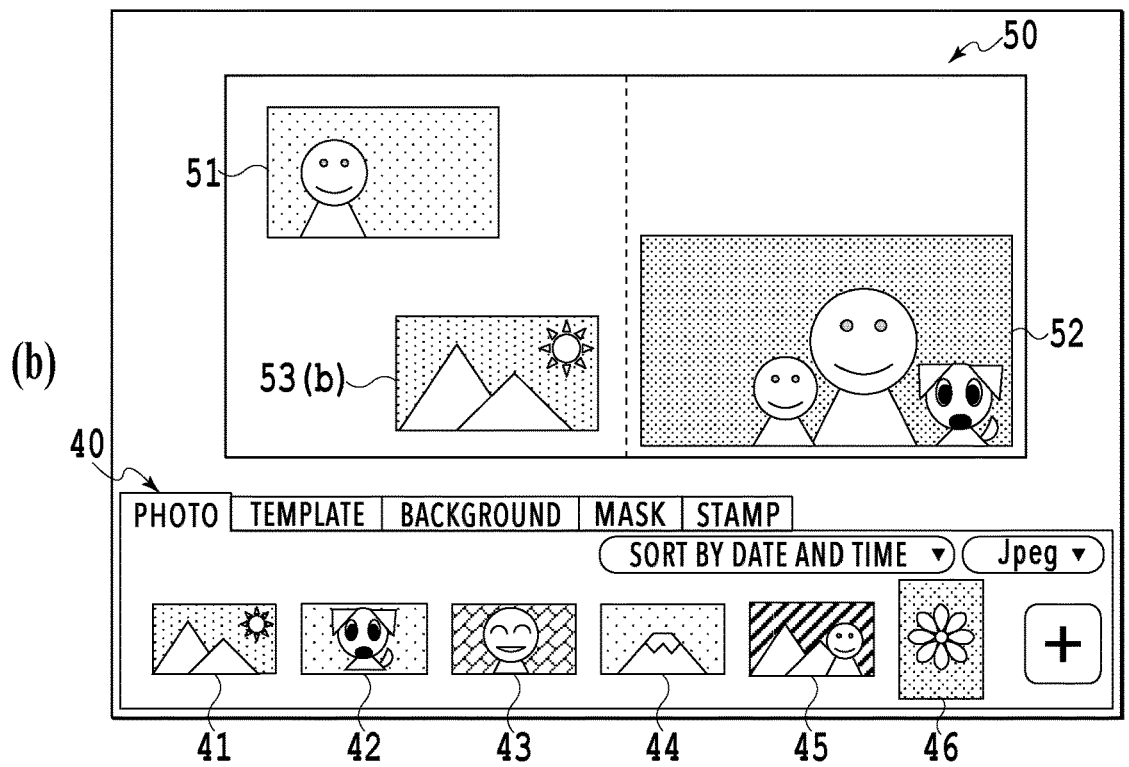
FIG.8B

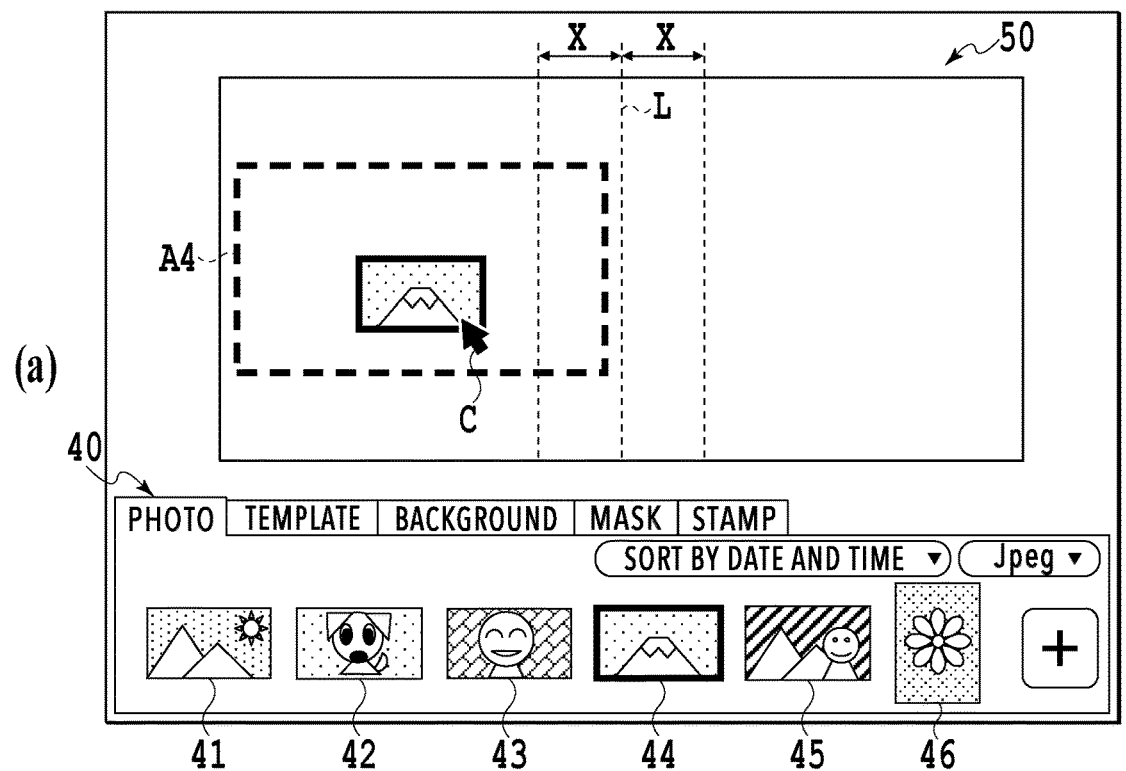
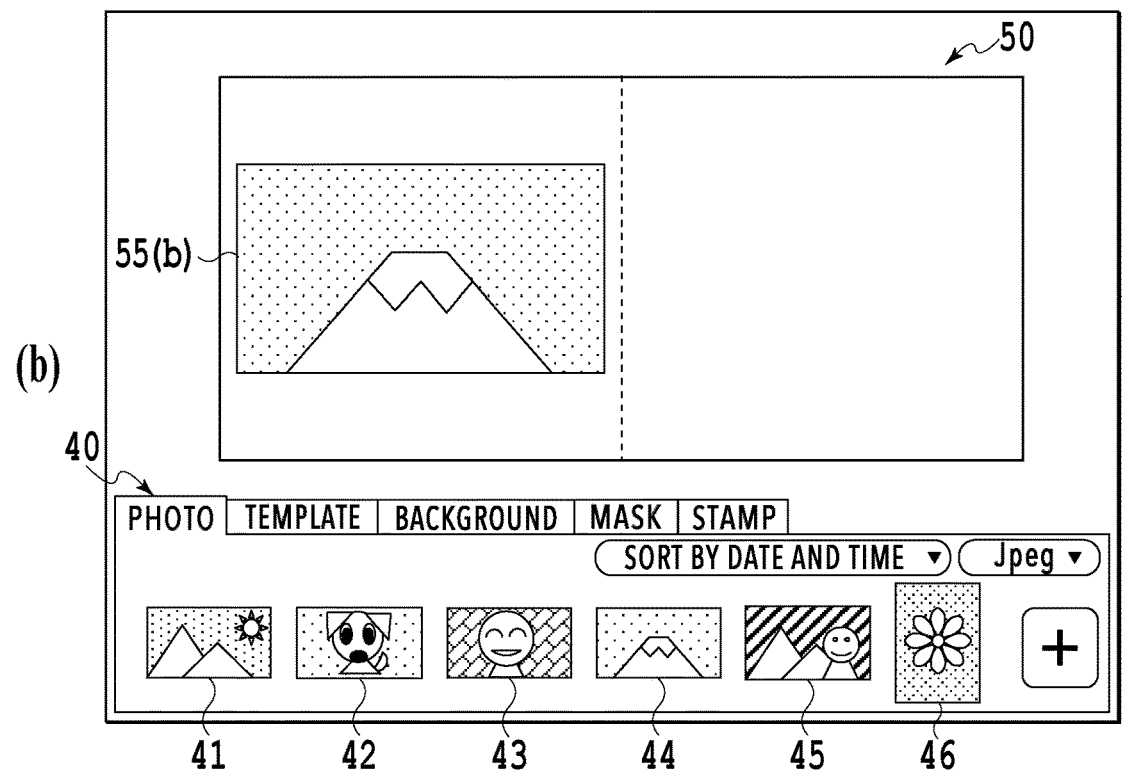
FIG.12B

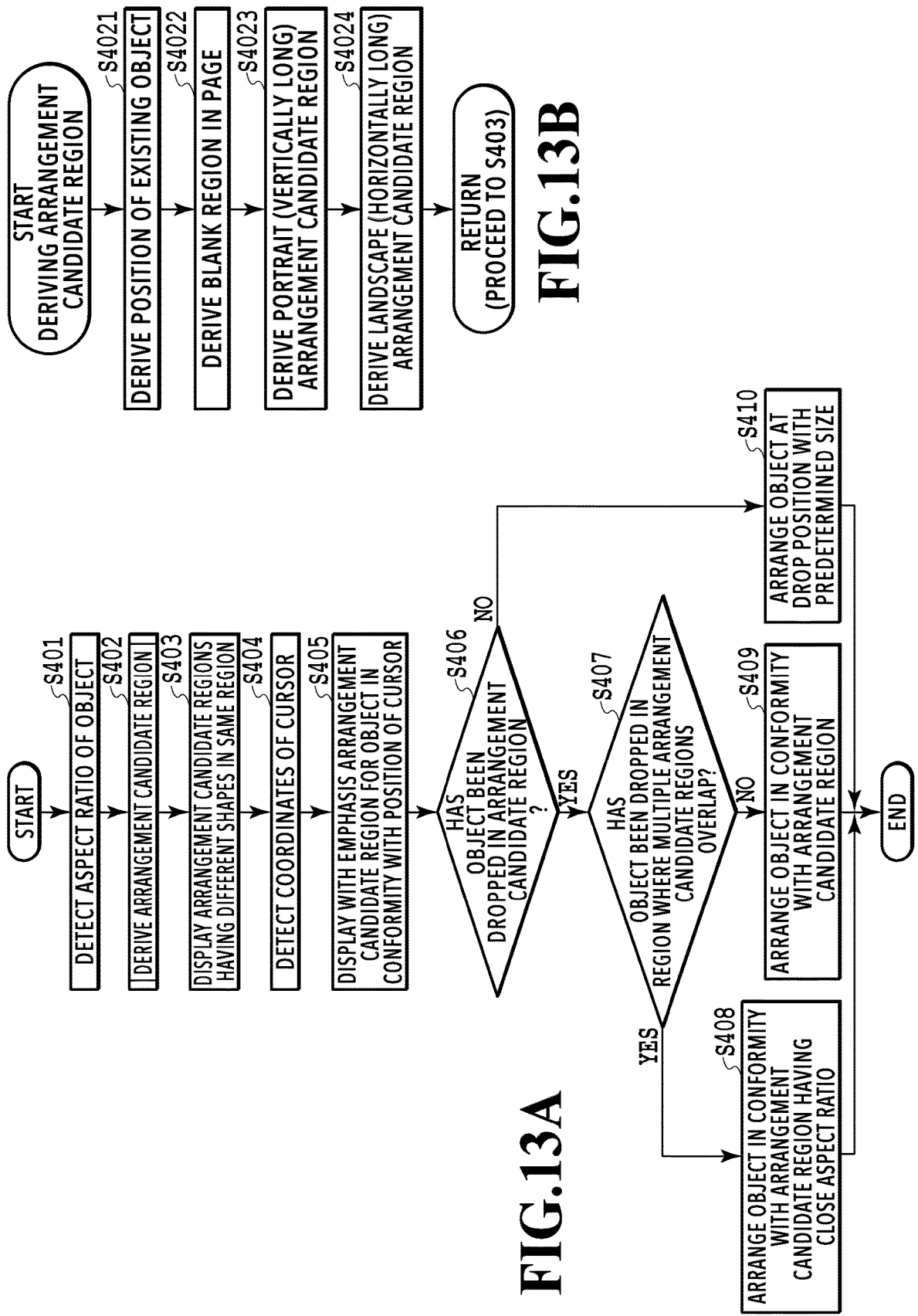

STORAGE MEDIUM, INFORMATION PROCESSING APPARATUS, AND INFORMATION PROCESSING METHOD THAT DISPLAY LEFT AND RIGHT PAGE REGIONS OF A DOUBLE-PAGE ALBUM SPREAD

BACKGROUND

Cross-Reference to Priority Application

This application claims the benefit of Japanese Patent Application No. 2022-154022, filed Sep. 27, 2022, which is hereby incorporated by reference herein in its entirety.

Field

The present disclosure relates to a technique for arranging and designing an object such as an image or a text.

Description of the Related Art

In layout software for arranging and designing objects such as images and texts, a technique for implementing automatic layout of objects to generate a layout image has been known. Japanese Patent Laid-Open No. 2021-27555 discloses a function of evaluating templates used for a layout and generating a layout image having a high aesthetic property in a case of implementing such automatic layout. This allows the user to easily achieve a layout having a high aesthetic property.

On the other hand, in a case of adding or deleting an object to or from a layout image generated in this way, objects in a page are rearranged based on a new template, to generate a new layout image. That is, while automatic layout allows the user to easily achieve a layout, there is a case when the layout during editing is changed irrespective of the user's intention when a new object is added or an existing object is deleted.

In view of this, Japanese Patent Laid-Open No. 2018-55533 discloses a technique of arranging an additional object in a blank region in a page without changing an existing layout when the object is added. According to Japanese Patent Laid-Open No. 2018-55533, an existing layout can be prevented from being changed when an object is added.

SUMMARY

However, in Japanese Patent Laid-Open No. 2018-55533, the user cannot arrange an additional object in conformity with the state of arrangement of objects other than the additional object with one operation. That is, in the case of arranging an object in a desired portion within a page, it is necessary for the user to once arrange the object at any position, and, thereafter, move the arranged object or adjust the sizes, which is burdensome for the user.

In view of the above-described problem, an object of the present disclosure is to improve convenience in a case when a user is conducting a layout operation.

An embodiment of the present invention is a non-transitory computer readable storage medium storing a program that causes a computer to execute an information processing method comprising a first displaying step of displaying a graphical user interface having a first region in which to arrange an object and a second region in which to display a list of an object that can be arranged in the first region, and a deriving step of deriving a candidate region in which to arrange an object selected by a user in the first region, based on a state of arrangement of an object other than the selected object in the first region.

Further features of the present invention will become apparent from the following description of exemplary embodiments with reference to the attached drawings.

BRIEF DESCRIPTION OF THE DRAWINGS

FIG. 8A and FIG. 8B are diagrams showing the editing screen;

FIG. 12A and FIG. 12B are diagrams showing the editing screen;

FIG. 13A and FIG. 13B are flowcharts of processing of adding an object;

DESCRIPTION OF THE EMBODIMENTS

Hereafter, embodiments of the present disclosure will be described with reference to the attached drawings. Note that the idea of the present disclosure can be applied to layout software in general such as a photo layout application, a photo album editing application, a poster production application, and presentation preparation software. In the following embodiments, a photo album editing application will be described as an example.

First Embodiment

<Information Processing Apparatus>

Figure 1:
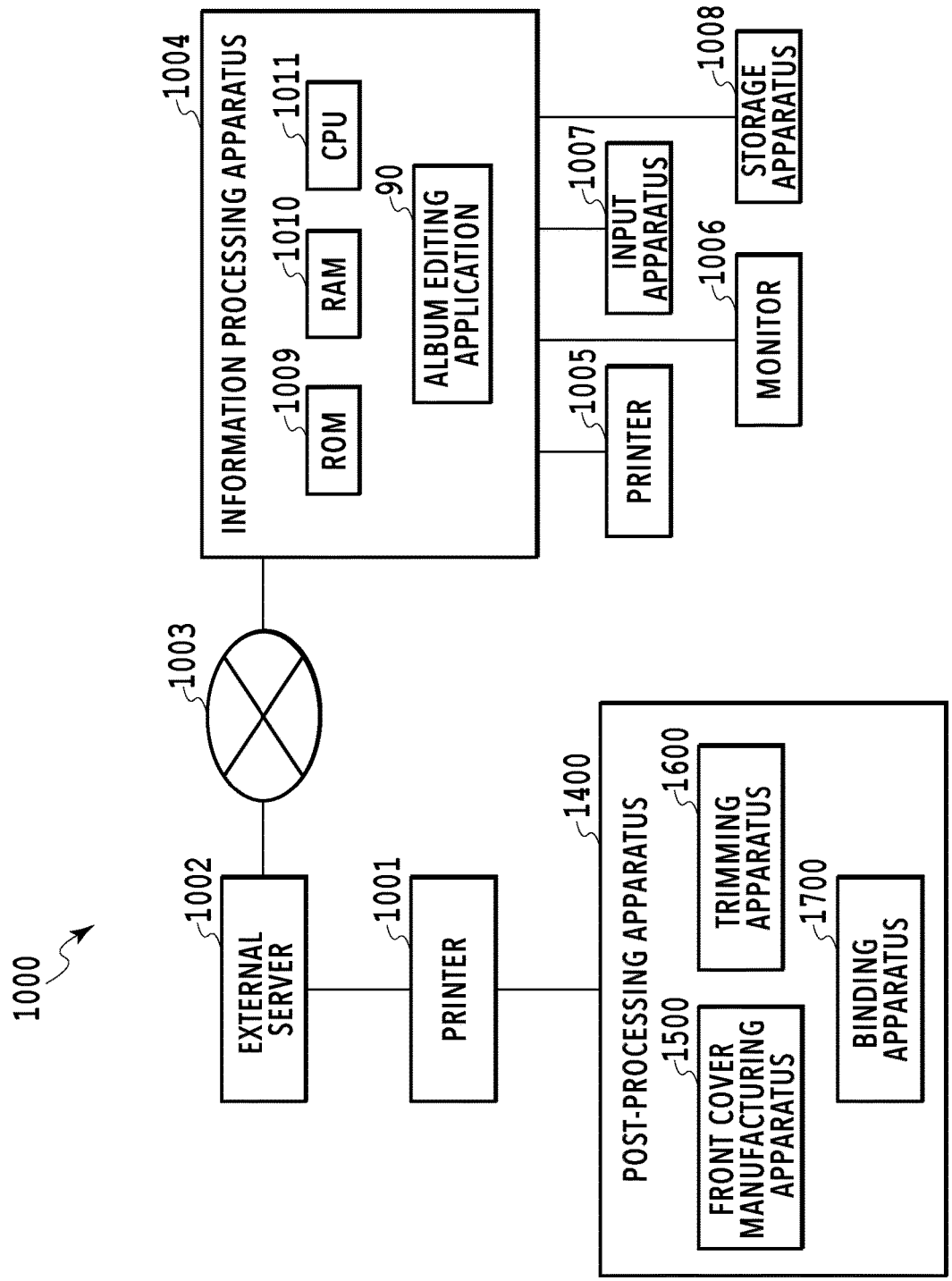
FIG. 1 is a block diagram showing a configuration of a printing system.
Figure 2:
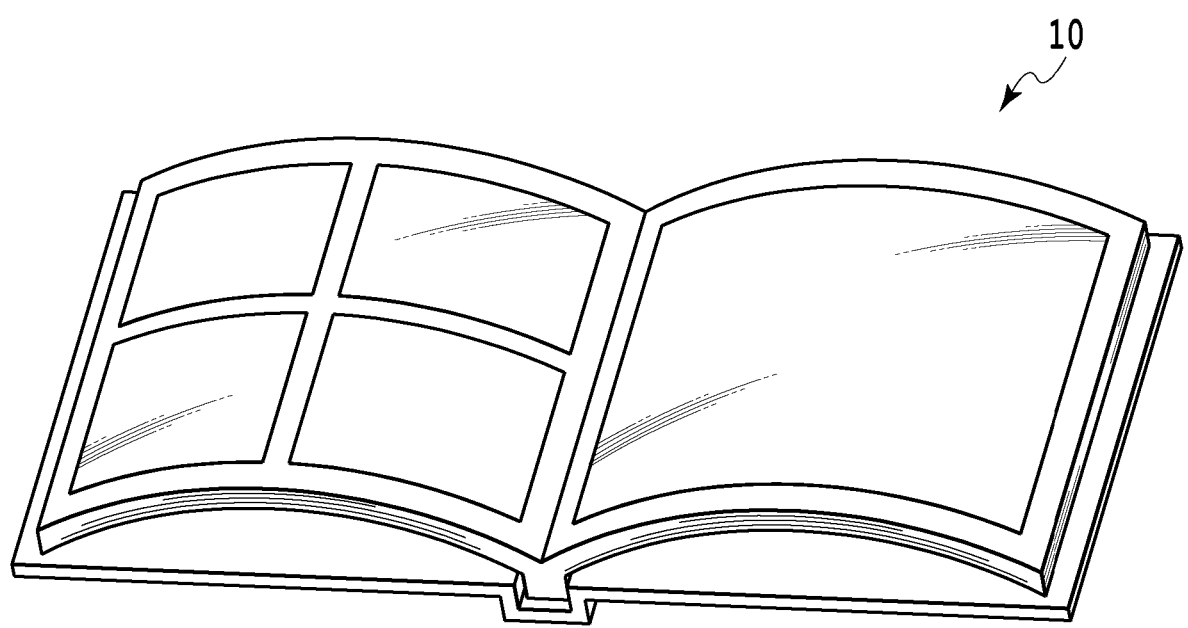
FIG. 2 is a diagram showing a created album.

FIG. 1 is a block diagram showing an example of a hardware configuration of a printing system 1000 in the present embodiment. First, a configuration of an information processing apparatus 1004 will be described. A program of an album editing application 90 (a program of an object layout) is stored in a ROM 1009 of the information processing apparatus 1004. The album editing application 90 is capable of creating album data for creating an album 10 (called a photo album, a photo book, or the like) as shown in FIG. 2, based on inputted image data. Note that, although the present embodiment is described with a printed product as the album 10, the printed product is not limited to an album. The present embodiment can be applied to layout software in general, which outputs not only the album 10, but any printed products.

The information processing apparatus 1004 is capable of outputting album data as print data to a printer 1005 and uploading album data to an external server 1002. Note that the print data may be the album data itself, or the print data may contain the album data and other data, or the print data may be created based on the album data. The information processing apparatus 1004 includes the ROM 1009, a RAM 1010, and a CPU 1011. In addition, to the information processing apparatus 1004, the printer 1005, a monitor 1006, an input apparatus 1007, and a storage apparatus 1008 are connected. In addition, the information processing apparatus 1004 includes an input and output interface (not shown) for connection with a network 1003. Note that the album data contains a plurality of pieces of double-page spread data. In addition, in each double-page spread data of a plurality of double-page spreads, one or a plurality of pieces of image data are arranged.

The CPU 1011 is a central processing unit, and executes an operating system program (here after, abbreviated as the OS) stored in the storage apparatus 1008, the ROM 1009, or the RAM 1010 to control the entire information processing apparatus 1004 (display control, and the like). In addition, the CPU 1011 executes programs stored in the ROM 1009 or the RAM 1010 to execute each function of the information processing apparatus 1004. In the ROM 1009, each program is stored. The RAM 1010 is a random access memory, and is used as a work memory of the CPU 1011. In addition, in the case when the RAM 1010 is a non-volatile RAM, each program is stored in the RAM 1010.

The information processing apparatus 1004 is capable of communicating with an external server 1002 via the network 1003. The external server 1002 includes an input and output interface (not shown) for connection with a printer 1001, and is capable of communicating with the printer 1001 via the input and output interface.

Album data created in the information processing apparatus 1004 is uploaded to the external server 1002 via the network 1003. The external server 1002 transmits print data based on the uploaded album data to the printer 1001. For example, the external server 1002 receives orders for creation of albums, manages orders for creation of albums, and creates print data based on album data and instructs the printer 1001 to make prints. The user uploads album data created by using the information processing apparatus 1004 to the external server 1002 and conducts a necessary procedure for purchase of an album. In the case when these operations of the user are properly conducted, the external server 1002 transmits print data based on the album data to the printer 1001. Thereafter, a printed product printed by the printer 1001 is bound by a post-processing apparatus 1400. In a binding step, the printed product is divided into a page of a front cover (referred to as a front cover page) and pages other than the front cover, and the front cover page is formed by a front cover manufacturing apparatus 1500 folding end portions of the page against thick paper. In addition, the pages other than the front cover are trimmed by a trimming apparatus 1600 for the purpose of aligning the end portions. Thereafter, the front cover page and the pages other than the front cover are bound by a binding apparatus 1700 into an album 10 as shown in FIG. 2, which is delivered to the user.

The printer 1005 executes printing based on the print data containing album data created in the information processing apparatus 1004. The printed product printed in the printer 1005 may be bound by the user. The monitor 1006 is a display apparatus for displaying image information outputted by the information processing apparatus 1004. The input apparatus 1007 is an input apparatus such as a keyboard or a pointing device for conducting input to the information processing apparatus 1004. Depending on the form, the input apparatus is integrated with a monitor, and there is also a touch panel with which input is conducted by directly touching a monitor. The storage apparatus 1008 is a storage apparatus such as an HDD or an SSD for storing image data, templates, and the like. Note that the configuration shown in FIG. 1 is only illustrative, and another configuration may be employed. For example, a configuration in which the information processing apparatus 1004 includes the monitor 1006, the input apparatus 1007, and the storage apparatus 1008 may be employed.

<Album Editing Application>

Next, processing of the album editing application of the present embodiment will be described with reference to FIGS. 3 to 6.

Figure 3:
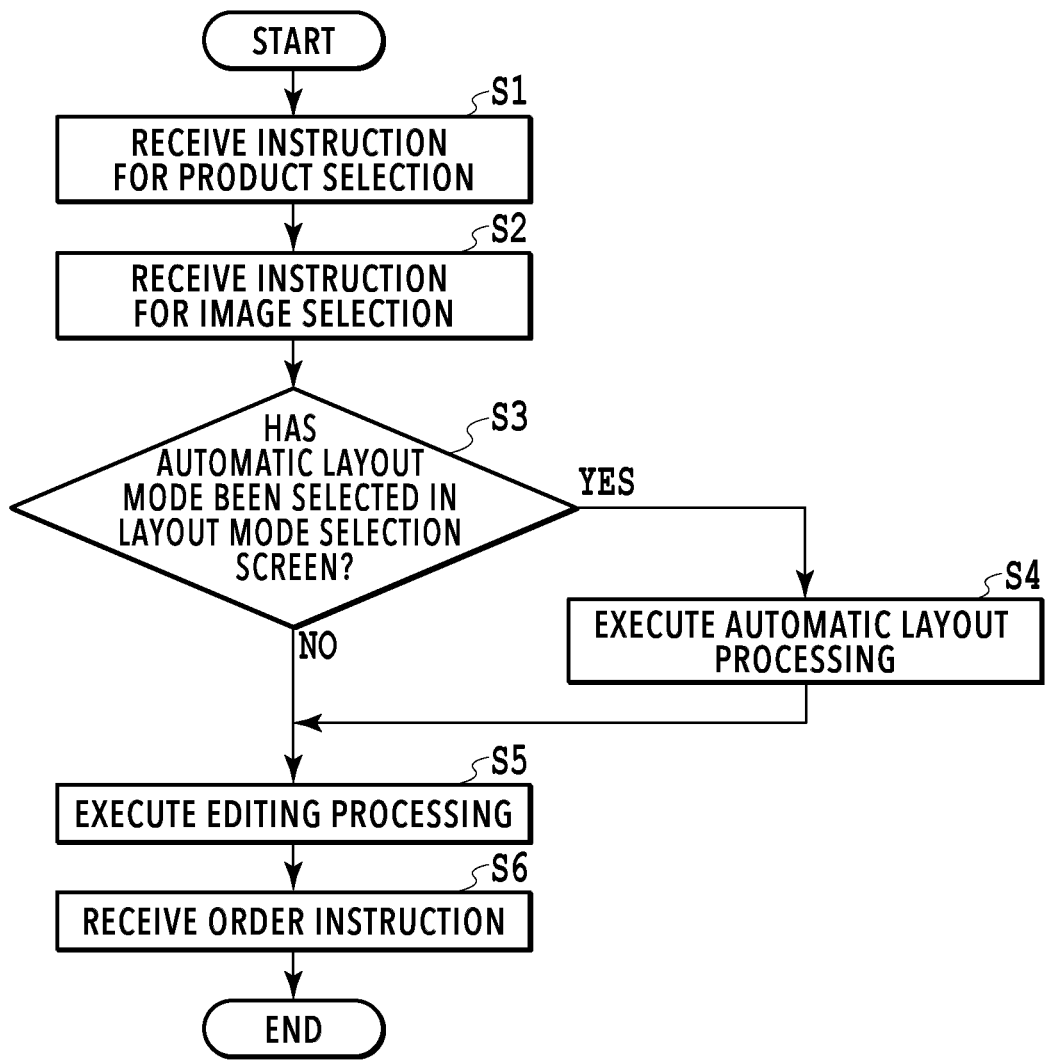
FIG. 3 is a flowchart of processing executed by an album editing application.

Once the user activates the album editing application 90, the processing of FIG. 3 starts. Note that each step of FIG. 3 is executed by the CPU 1011 reading a program involved in the processing of the flowchart from a memory.

First, in step S1, the CPU 1011 receives an instruction for product selection made by the user, and sets the size of the album, the type of a cover, the binding form, the number of pages of the entire album, the type of paper, and the like. Here after, "step S-" is abbreviated as "S-".

In S2, the CPU 1011 receives an instruction for image selection made by the user. Once the user selects a desired folder, a list screen of image data stored in the selected folder. In the case when the user has selected image data via this screen, the CPU 1011 executes processing of S2.

Figure 4:
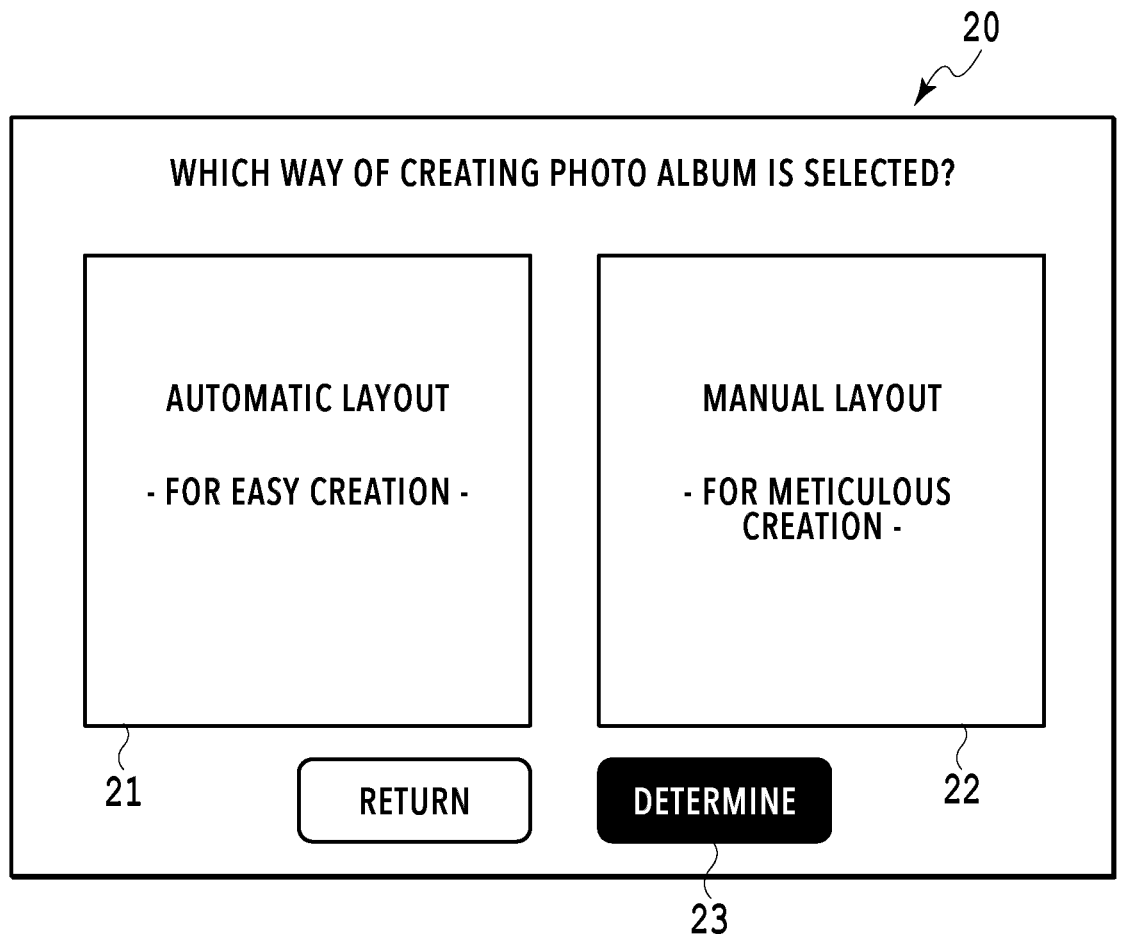
FIG. 4 is a diagram showing a layout mode selection screen.

In S3, the CPU 1011 determine whether an automatic layout mode has been selected as a layout mode in response to the operation of the user in a layout mode selection screen 20 of FIG. 4. If the result of the determination in this step is true, that is, if pressing of a determination button 23 is detected after pressing of an automatic layout button 21 of FIG. 4, the processing proceeds to S4. On the other hand, if the result of the determination in this step is false, that is, if pressing of the determination button 23 is detected after pressing of a manual layout button 22 of FIG. 4, the processing proceeds to S5.

If the result of determination in S3 is true (that is, if the automatic layout mode is selected), in S4, the CPU 1011 executes automatic layout processing. Specifically, the CPU 1011 first evaluates the image data indicated by the instruction for image selection received in S2, and scores each piece of the image data. Then, image data to be arranged in album data is selected based on the score assigned to each piece of the image data. The CPU 1011 lays out the selected image data in a double-page spread region 50 (see FIG. 5). The double-page spread region 50 is an arrangement region for arranging objects (images in the present example), and is also an editing region for the user to edit the objects arranged in this arrangement region. Note that, in the automatic layout processing, the processing to determine a double-page spread in which image data is arranged and the processing to determine the size of image data to be arranged are automatically conducted. In addition, if the automatic layout mode is selected (YES in S3), the CPU 1011 lays out all the image data indicated by the instruction for image selection received in S2 in any double-page spread.

If the result of the determination in S3 is false (that is, if the manual layout mode is selected), the user conducts the selection of image data to be arranged in album data, the determination of a double-page spread in which the image data is to be arranged, and the determination of the size of the image data. For example, if the manual layout mode is selected (NO in S3), among the image data indicated by the instruction for image selection received in S2, only images selected by the user in editing processing (S5), which will be described later, are laid out in a double-page spread.

Once the determination processing on whether the automatic layout mode has been selected (S3) or the automatic layout processing (S4) ends, in S5, the CPU 1011 executes the editing processing in accordance with the operation of the user. In the case of executing the editing processing via the automatic layout processing (S4), the CPU 1011 displays an editing screen 30 (see FIG. 5) containing a double-page spread in which the image data has been laid out. On the other hand, in the case of executing the editing processing without via the automatic layout processing (S4), the CPU 1011 displays the editing screen 30. Note that, in the case when the editing processing without via the automatic layout processing (S4) is executed and the editing screen 30 is first displayed, no image data has been arranged in the double-page spread region 50. In addition, the editing screen 30 is provided by the album editing application 90.

The editing screen 30 has a check box 31 for switching the layout mode, an order button 70, and an environment setting button 80. In addition, the editing screen 30 has an image selection region 40. The check box 31 receives selection of which of the automatic layout and the manual layout is conducted.

Figure 5:
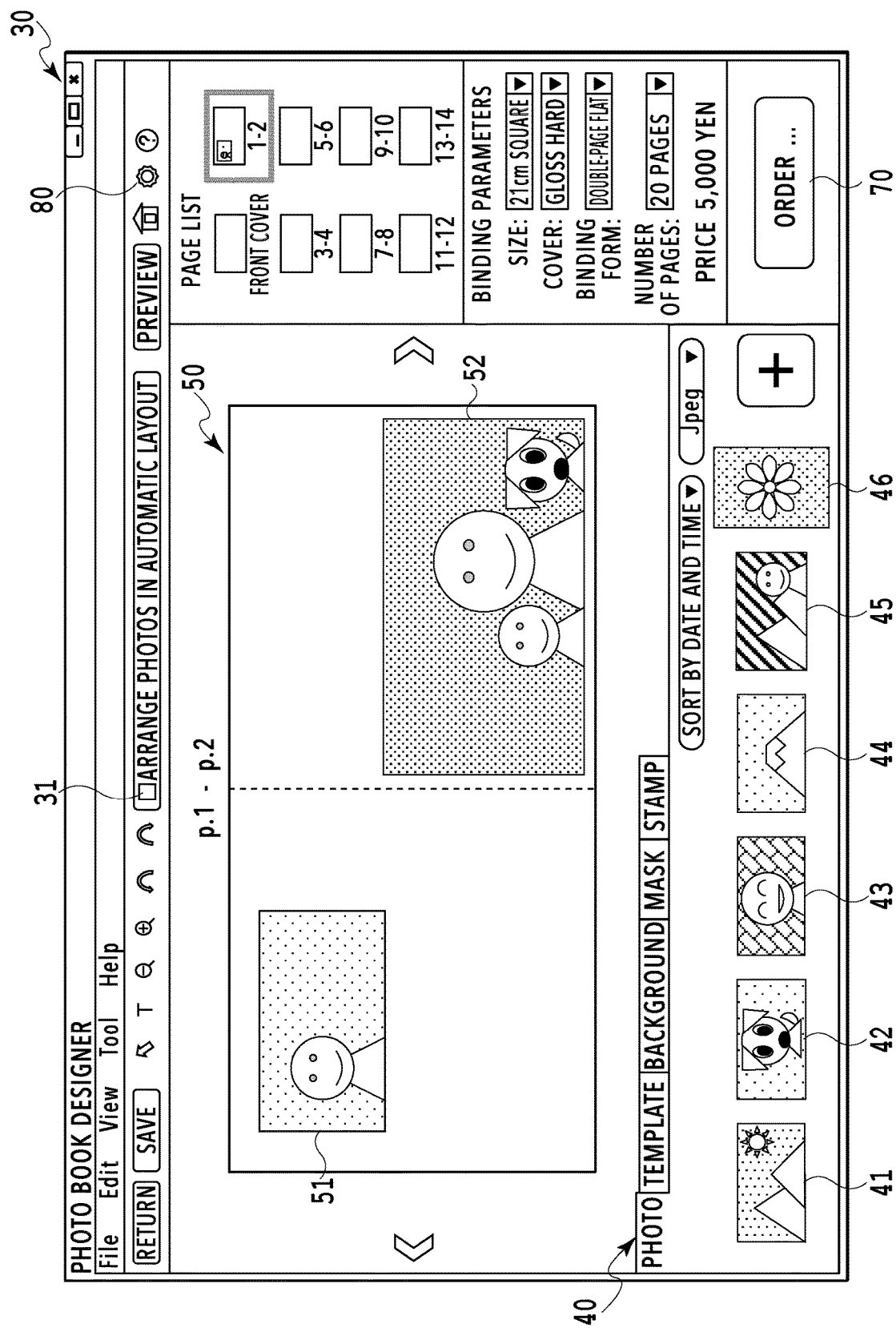
FIG. 5 is a diagram showing an editing screen.

In the image selection region 40, a list of objects that can be arranged in the double-page spread region 50 is displayed. In the graphical user interface shown in FIG. 5, images 41 to 46 are displayed in the image selection region 40 as an image data group indicated by the instruction for image selection received in the aforementioned S2. In addition, the editing screen 30 has the double-page spread region 50 for an album. Upon detecting a drag and drop operation from the image data in the image selection region 40 to the double-page spread region 50 by the user, the CPU 1011 arranges and displays the image data subjected to the detected drag and drop operation in the double-page spread region 50. Note that FIG. 5 shows a result of the user arranging the image 51 and the image 52 in the double-page spread region 50 of the editing screen 30 in an initial state.

In addition, the album editing application 90 has an environment setting function with which the user can switch the display in conducting the editing work in accordance with the user's preference. The environment setting button 80 is used by the user to switch the display in conducting the editing work in accordance with the user's preference. Upon receiving the pressing of the environment setting button 80, the CPU 1011 displays an environment setting screen 81 shown in FIG. 6 in place of the editing screen 30 (or together with the editing screen 30). Each check box of the environment setting screen 81 receives selection by the user. In addition, in the case when the user presses a closing button 83 after setting via the environment setting screen 81, the CPU 1011 receives the user input, and deletes the displayed environment setting screen 81 and transitions to the state where input can be made via the editing screen 30. Note that items that can be switched in the environment setting screen 81 are not limited to six items shown in FIG. 6, and the items can be changed in accordance with the type of an application.

After the end of the album editing, the user presses the order button 70. Thereafter, in S6, the CPU 1011 receives the order instruction of the user, and completes the series of processing. The outline of the processing of the album editing application is as described above.

<Display Control on Arrangement Candidate Regions for Additional Object in Accordance with Layout Condition>

Figure 7B:
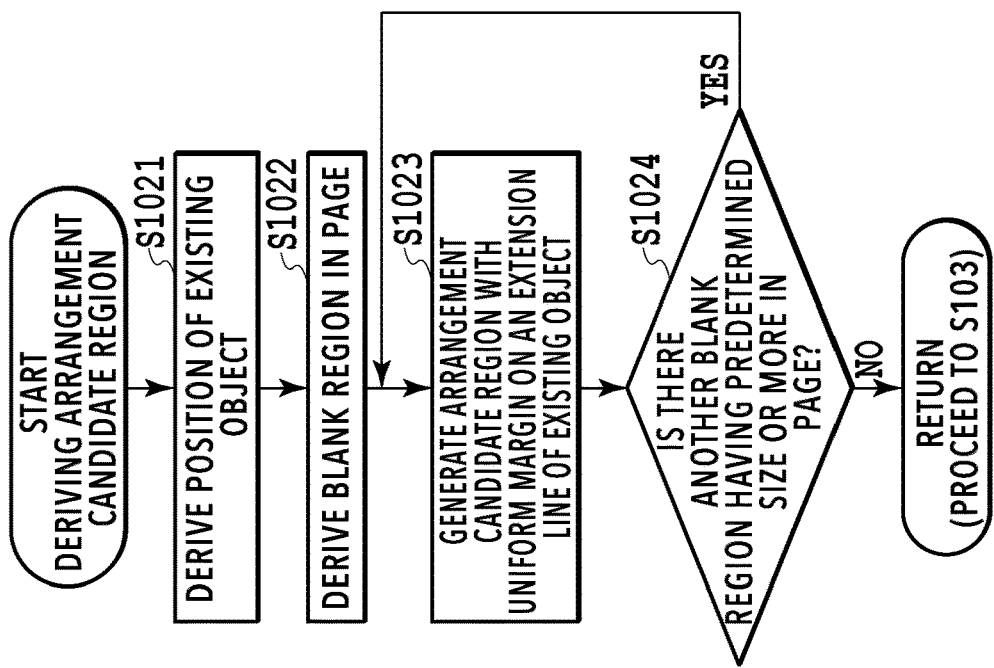
FIG. 7A and FIG. 7B are flowcharts of processing of adding an object.

Subsequently, a display control in accordance with a layout condition of candidates for a region (referred to as arrangement candidate regions) for arranging an additional object, which is a characteristic of the present embodiment, will be described using FIG. 7A and FIG. 7B, as well as FIG. 8A and FIG. 8B. In the present embodiment, in the case when the user adds the image data in the image selection region 40 to the double-page spread region 50 through drag and drop, arrangement candidate regions are derived and displayed in the double-page spread region 50. Note that FIG. 7A and FIG. 7B are flowcharts showing the processing of the present embodiment, and FIG. 8A and FIG. 8B each shows editing screens of the present embodiment.

In the present embodiment, as shown in (a) of FIG. 8A, as an example of an editing operation conducted in the double-page spread region 50 of an album, a case when an image is selected and added from the image selection region 40 in the state where the image 51 and the image 52 are arranged in the double-page spread region 50 of the album will be described. Note that the technical idea of the present embodiment is not limited to only the case when an image is added from the image selection region 40, but may be applied, for example, to the case where an image present in the double-page spread region 50 is moved within the same region.

Figure 7A:
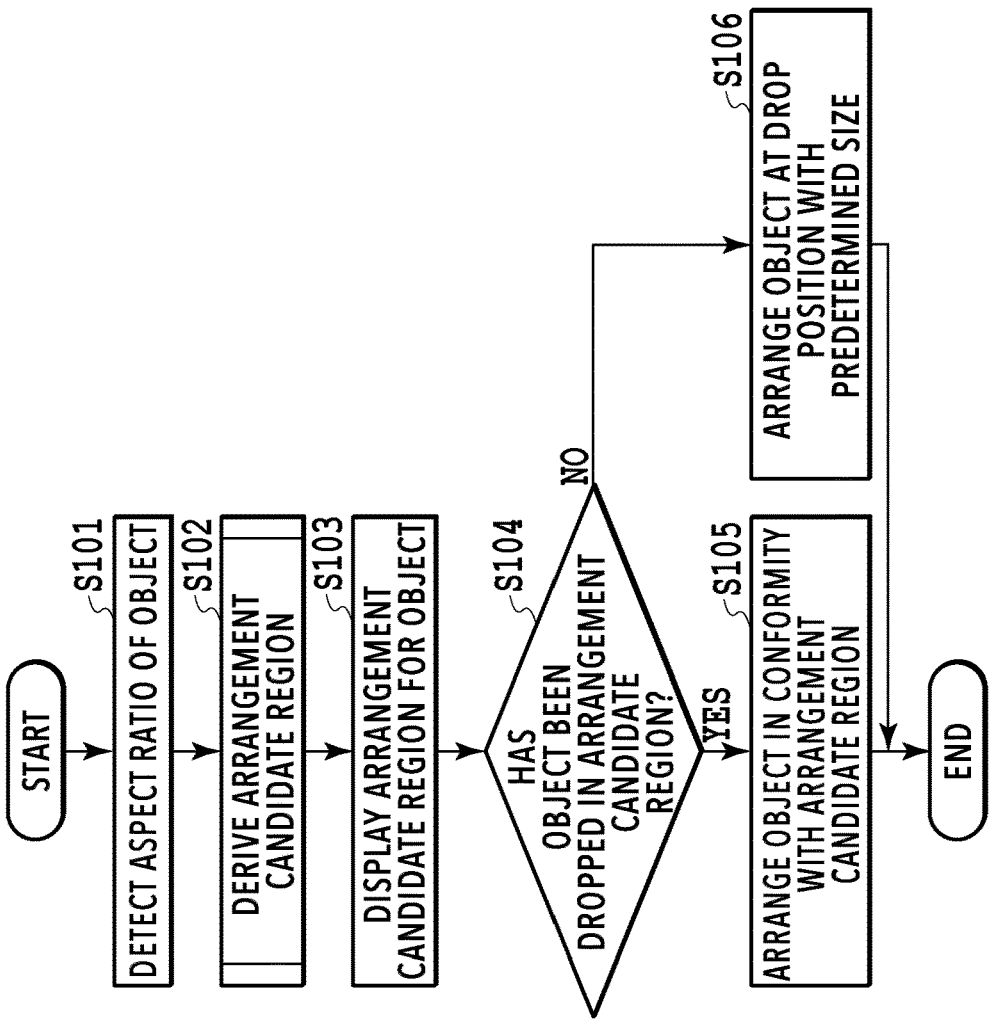
Figure 8A:
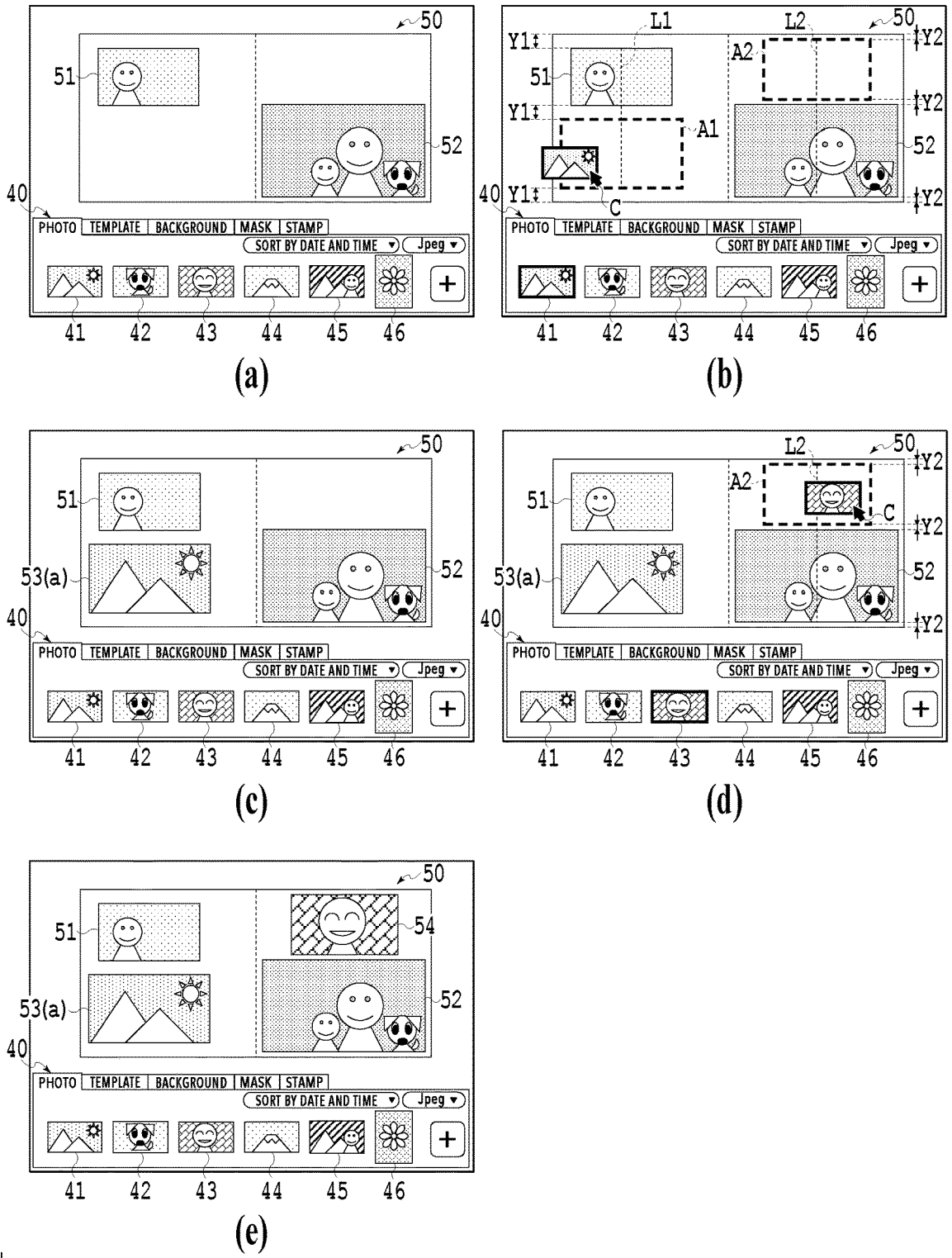

In the case when an instruction by the user regarding addition of an image from the image selection region 40 to the double-page spread region 50 is detected, image addition processing of FIG. 7A is started.

In S101, the CPU 1011 detects an aspect ratio of an object to be added. In the present embodiment, an aspect ratio of an image to be added from the image selection region 40 is detected. For example, in the case when the image 41 is added as shown in (b) of FIG. 8A, the aspect ratio of the image 41 is detected.

Subsequently, in S102, the CPU 1011 derives an arrangement candidate region corresponding to the object to be added, as a partial region within a predetermined region range. In the present embodiment, an arrangement candidate region for the image 41 in the double-page spread region 50 of the album is derived (the position and size of the arrangement candidate region for the image 41 are determined). An example of a specific deriving method will be described using the flowchart shown in FIG. 7B and the editing screen shown in (b) of FIG. 8A.

In S1021, in the case when there is an existing object which has already been arranged, the CPU 1011 derives the position of the existing object. In the present embodiment, position information on the respective image regions of the image 51 and the image 52 present in the double-page spread region 50 is obtained.

Next, in S1022, the CPU 1011 derives a blank region in which no existing object has been arranged as a partial region within the predetermined region range. In the present embodiment, a blank region in the double-page spread region 50 is derived.

Subsequently, in S1023, the CPU 1011 derives an arrangement candidate region that has the same center line as the center line of an existing object in the horizontal direction (the X direction) and has upper and lower margins uniform with the margins of the existing object. Specifically, in the present embodiment, an arrangement candidate region A1 that has uniform upper and lower margin widths Y1 is derived on an extension line of the center line L1 of the image 51. Note that, in the present example, the arrangement candidate region means a slot frame.

Moreover, in S1024, the CPU 1011 determines whether there is another blank region that can be an arrangement candidate region (that is, that has a predetermined size or more). If the result of the determination in this step is true, the CPU 1011 executes the processing of S1023 again. Note that, in the present embodiment, specifically, as shown in (b) of FIG. 8A, the CPU 1011 derives an arrangement candidate region A2 that has uniform upper and lower margin widths Y2 on an extension line of the center line L2 of the image 52 in S1023.

On the other hand, if the result of the determination in S1024 is false, the CPU 1011 ends the processing of S102 and proceeds to S103. Note that the determination on whether there is a blank region is conducted, for example, by using predetermined thresholds for blank regions. As the thresholds for blank regions a combination of thresholds for the length (width) in the horizontal direction (the X direction) and the length (height) in the vertical direction (the Y direction) can be considered, and, as an example, such thresholds are set like a width of 30 mm× a height of 30 mm.

In S103, the CPU 1011 displays the arrangement candidate region derived in S102. In the present embodiment, the CPU 1011 displays the arrangement candidate region A1 and the arrangement candidate region A2 for the image 41. Note that, although in the present embodiment, the arrangement candidate regions are indicated by dotted lines, the display method is not limited to this, and another display method, such as a dashed dotted line, may be employed.

Subsequently, in S104, the CPU 1011 determines whether the image 41 has been dropped in the arrangement candidate region A1 or the arrangement candidate region A2. Note that, in the present embodiment, the coordinates of the cursor C are used as a reference for determining the drop position. That is, in the case when the image 41 is dropped in the state where the cursor C is present within the range of the arrangement candidate region A1 or the arrangement candidate region A2, the result of the determination in this step becomes true.

If the result of the determination in S104 is true, in S105, the CPU 1011 arranges the image 41, which is the object to be added, in conformity with the arrangement candidate region A1 or the arrangement candidate region A2. For example, as in (b) of FIG. 8A, in the case when dropping processing into the arrangement candidate region A1 is detected in the state where the cursor C is on the arrangement candidate region A1, the image 41 is arranged as indicated by an image 53(a) in (c) of FIG. 8A.

On the other hand, if the result of the determination in S104 is false, the CPU 1011 proceeds to S106. In the case when the image 41 has not been dropped in the arrangement candidate region A1 or the arrangement candidate region A2, in S106, the CPU 1011 arranges the image 41 at any position at the time of dropping in accordance with a predetermined size that is set in advance. As an example, the predetermined size is set as a size that has a width of 100 mm and a fixed aspect ratio. Specifically, as shown in (a) of FIG. 8B, in the case when dropping processing of the image 41 is detected in the state where the cursor C is present outside the arrangement candidate region A1 or the arrangement candidate region A2, the CPU 1011 arranges the image 41 at any position, as indicated by an image 53(b) in (b) of FIG. 8B. The any position mentioned herein is a position including at least the position at which the cursor C was present.

In this way, the user can arrange an image in accordance with a derive arrangement candidate region, or can arrange an image at any position.

Once the processing of adding an image is completed, the processing of the flowchart of FIG. 7A ends. The flow of the series of the processing of the present embodiment is as described above.

Note that, in the case when a continuous instruction of adding an image to the double-page spread region 50 is detected, the processing of FIG. 7A is executed again. In this event, the CPU 1011 derives an arrangement candidate region in the double-page spread region 50 again, in accordance with the processing of the flowchart of FIG. 7A. For example, in the case when an image 43 is added as shown in (d) of FIG. 8A, the CPU 1011 displays the arrangement candidate region A2, and, in the case when dropping processing to the arrangement candidate region A2 is detected, the image 43 is arranged as indicated by an image 54 shown in (e) of FIG. 8A.

Note that, in the present embodiment, the configuration in which an arrangement candidate region is derived or displayed at the time of adding an image is described as an example, the configuration is not limited to this. For example, an arrangement candidate region may have been derived in advance based on an aspect ratio of each object in the image selection region 40. Then, in response to selection of any of the objects in the image selection region 40, the arrangement candidate region derived based on the aspect ratio of the selected object may be displayed.

Advantageous Effects of the Present Embodiment

As described above, in the present embodiment, a blank region is derived based on the arrangement of existing objects, which have already arranged within a predetermined region range, and an arrangement candidate region for an object to be added is displayed. In addition, the arrangement of the new object is conducted in accordance with a drag operation to the arrangement candidate region. This makes it possible to efficiently achieve a layout having high aesthetic property in which the centers and upper and lower margins of images have been aligned in accordance with the state of arrangement of objects, and to improve the convenience for the user at the time of editing work.

Second Embodiment

Hereafter, a second embodiment will be described. In the present embodiment, a display form of an arrangement candidate region is different from the first embodiment. Specifically, while a rectangular frame surrounded by a dashed line is displayed as the arrangement candidate region in the first embodiment (see (b) of FIG. 8A), a preview image is also displayed in a frame in an arrangement candidate region in the present embodiment. Note that, in the following description, the same configurations as those in the aforementioned embodiment are denoted by the same reference signs and the same names, and a description thereof will be omitted as appropriate.

<Display Control on Arrangement Candidate Regions for Additional Object in Accordance with Layout Condition>

Figure 9:
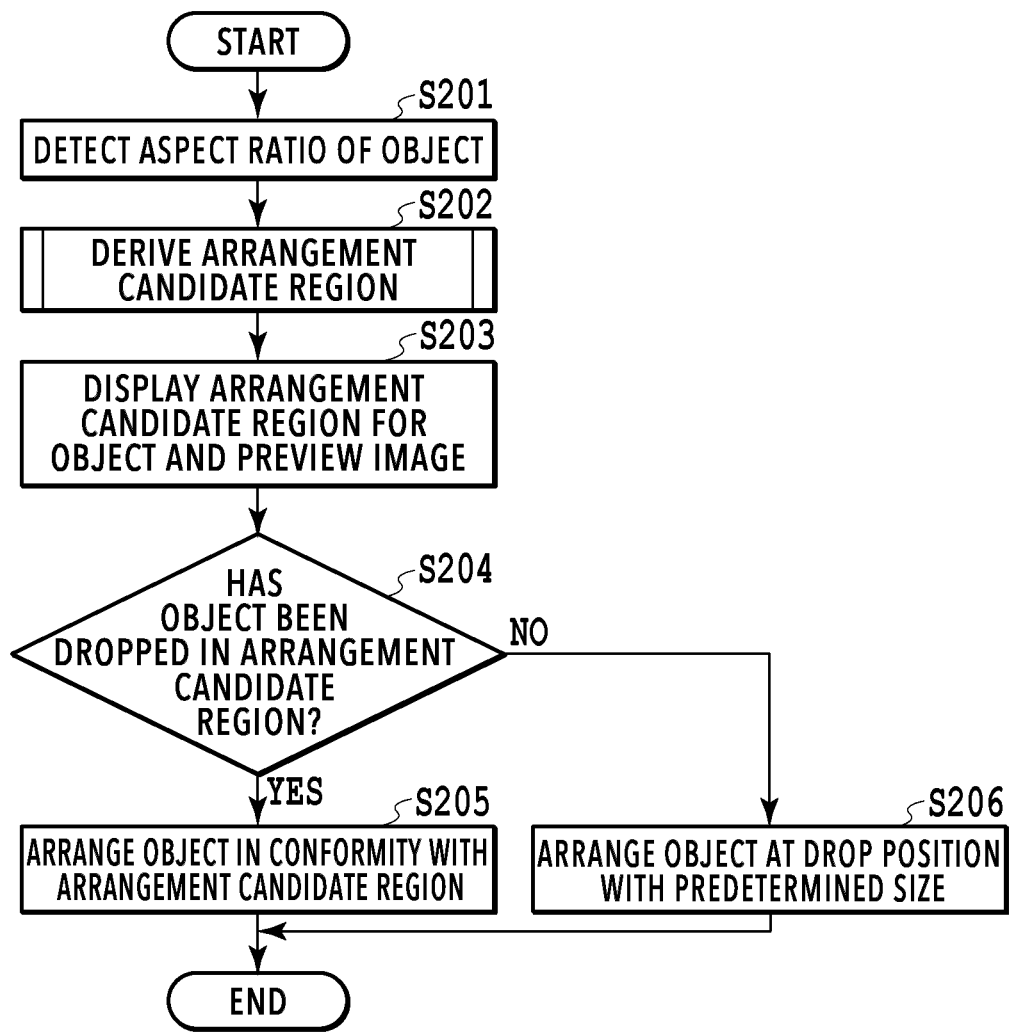
FIG. 9 is a flowchart of processing of adding an object.
Figure 10A:
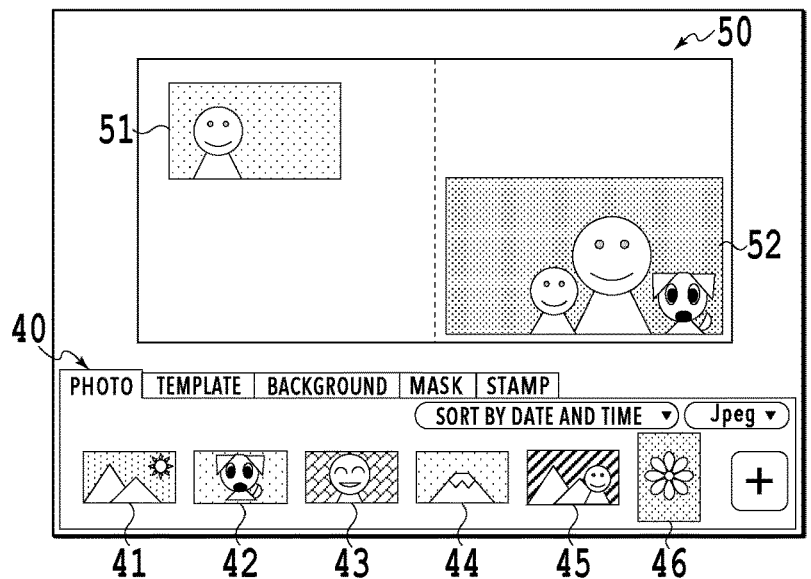
FIG. 10A, FIG. 10B, and FIG. 10C are diagrams showing an editing screen.
Figure 10B:
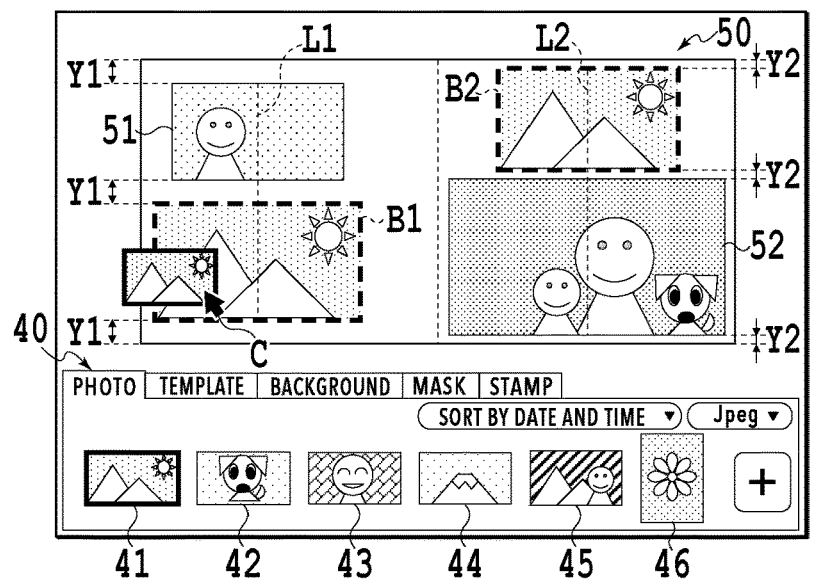
Figure 10C:
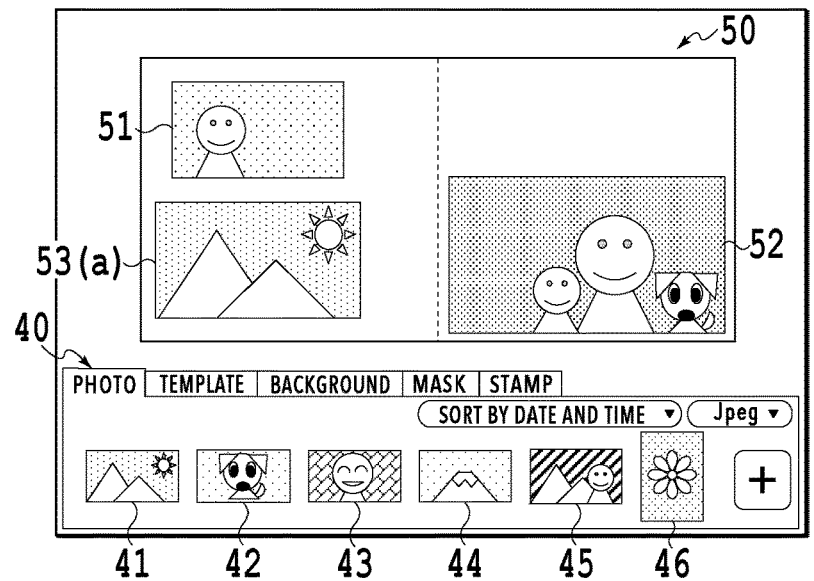

Hereafter, a display control on an arrangement candidate region in the present embodiment will be described using FIG. 9 and FIG. 10A, FIG. 10B, and FIG. 10C. FIG. 9 is a flowchart showing processing of the present embodiment, and FIG. 10A, FIG. 10B, and FIG. 10C show an editing screen of the present embodiment. Note that, each step of FIG. 9 is executed by the CPU 1011 reading and processing a program involved in the processing of the flowchart from a memory. In addition, a series of processing of the album editing application 90 is the same as that of the first embodiment (see FIG. 3), and, thus, the detailed description thereof will be omitted.

In the present embodiment, as shown in FIG. 10A, as an example of addition of an object, a case when an image is selected and added from the image selection region 40 in the state where the image 51 and the image 52 are arranged in the double-page spread region 50 of the album will be described.

In a case when an instruction by the user regarding addition of an image from the image selection region 40 to the double-page spread region 50 is detected, image addition processing of FIG. 9 is started.

In S201, the CPU 1011 detects an aspect ratio of an object to be added. In the present embodiment, an aspect ratio of an image to be added from the image selection region 40 is detected. For example, in the case when the image 41 is added as shown in FIG. 10B, the aspect ratio of the image 41 is detected.

Subsequently, in S202, the CPU 1011 derives an arrangement candidate region corresponding to the object to be added, as a partial region within a predetermined region range. In the present embodiment, an arrangement candidate region for the image 41 in the double-page spread region 50 of the album is derived. Since the specific deriving method has already been described in the first embodiment, the detailed description thereof will be omitted.

In S203, the CPU 1011 displays the arrangement candidate region derived in S202. In the present embodiment, the CPU 1011 displays an arrangement candidate region B1 and an arrangement candidate region B2 for the image 41. In addition, in the present embodiment, the CPU 1011 displays a preview image of the image 41 during the drag operation in the arrangement candidate region B1 and the arrangement candidate region B2. This allows the user to determine the arrangement while checking the preview image after the arrangement in the case of adding the image.

Subsequently, in S204, the CPU 1011 determines whether the image 41 has been dropped in the arrangement candidate region B1 or the arrangement candidate region B2. Note that, in the present embodiment, the coordinates of the cursor C are used as a reference for determining the drop position.

If the result of the determination in S204 is true, in S205, the CPU 1011 arranges the image 41, which is the object to be added, in conformity with the arrangement candidate region B1 or the arrangement candidate region B2. For example, as in FIG. 10B, in the case when dropping processing into the arrangement candidate region B1 is detected in the state where the cursor C is on the arrangement candidate region B1, the image 41 is arranged as indicated by an image 53(a) in FIG. 10C.

On the other hand, if the result of the determination in S204 is false, the CPU 1011 proceeds to S206. In the case when the image 41 has not been dropped in the arrangement candidate region B1 or the arrangement candidate region B2, in S206, the CPU 1011 arranges the image 41 at any position at the time of dropping in accordance with a predetermined size that is set in advance. Since this processing is the same as the processing of S106 in the first embodiment, the detailed description thereof will be omitted.

Once the processing of adding an image is completed, the processing of the flowchart of FIG. 9 ends. The flow of the series of the processing of the present embodiment is as described above. Note that, since the processing in the case where a continuous instruction of adding an image to the double-page spread region 50 is detected is the same as in the first embodiment, the detailed description thereof will be omitted.

Advantageous Effects of the Present Embodiment

As described above, in the present embodiment, a blank region is derived based on the arrangement of existing objects, which have already arranged within a predetermined region range, and an arrangement candidate region for an object to be added is displayed. In addition, a preview image of an object to be added is displayed together with the arrangement candidate region. This makes it possible to arrange an image, checking the preview image, while efficiently achieving a layout having high aesthetic property in which the centers and upper and lower margins of images have been aligned in accordance with the state of arrangement of objects, and to improve the convenience for the user at the time of editing work.

Third Embodiment

Hereafter, a third embodiment will be described. The present embodiment is such that an arrangement candidate region is changed in accordance with the position of a cursor, in contrast to the first embodiment.

<Display Control on Arrangement Candidate Regions for Additional Object in Accordance with Layout Condition>

Figures 11A, 11B:
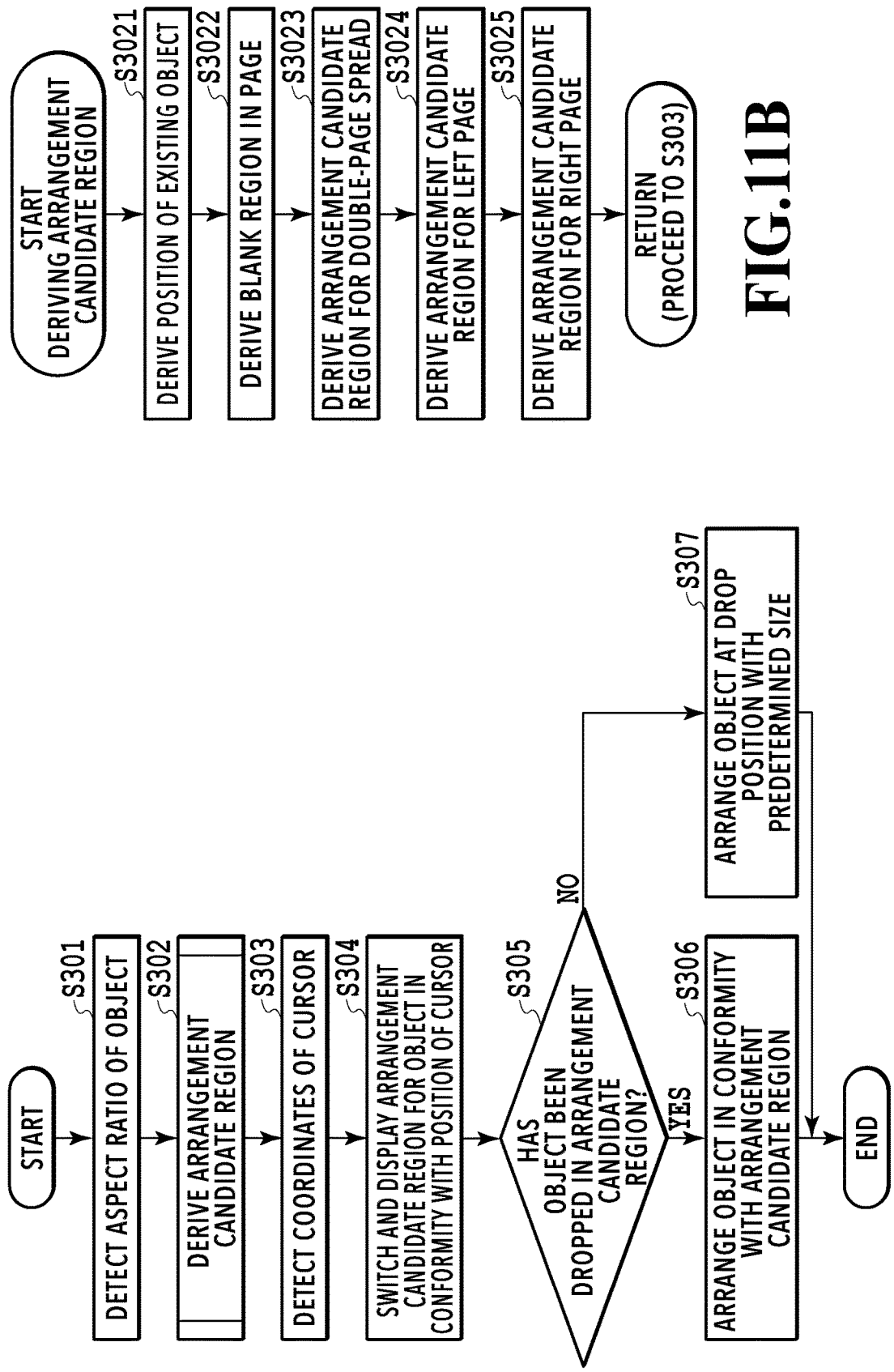
FIG. 11A and FIG. 11B are flowcharts of processing of adding an object.
Figure 12A:
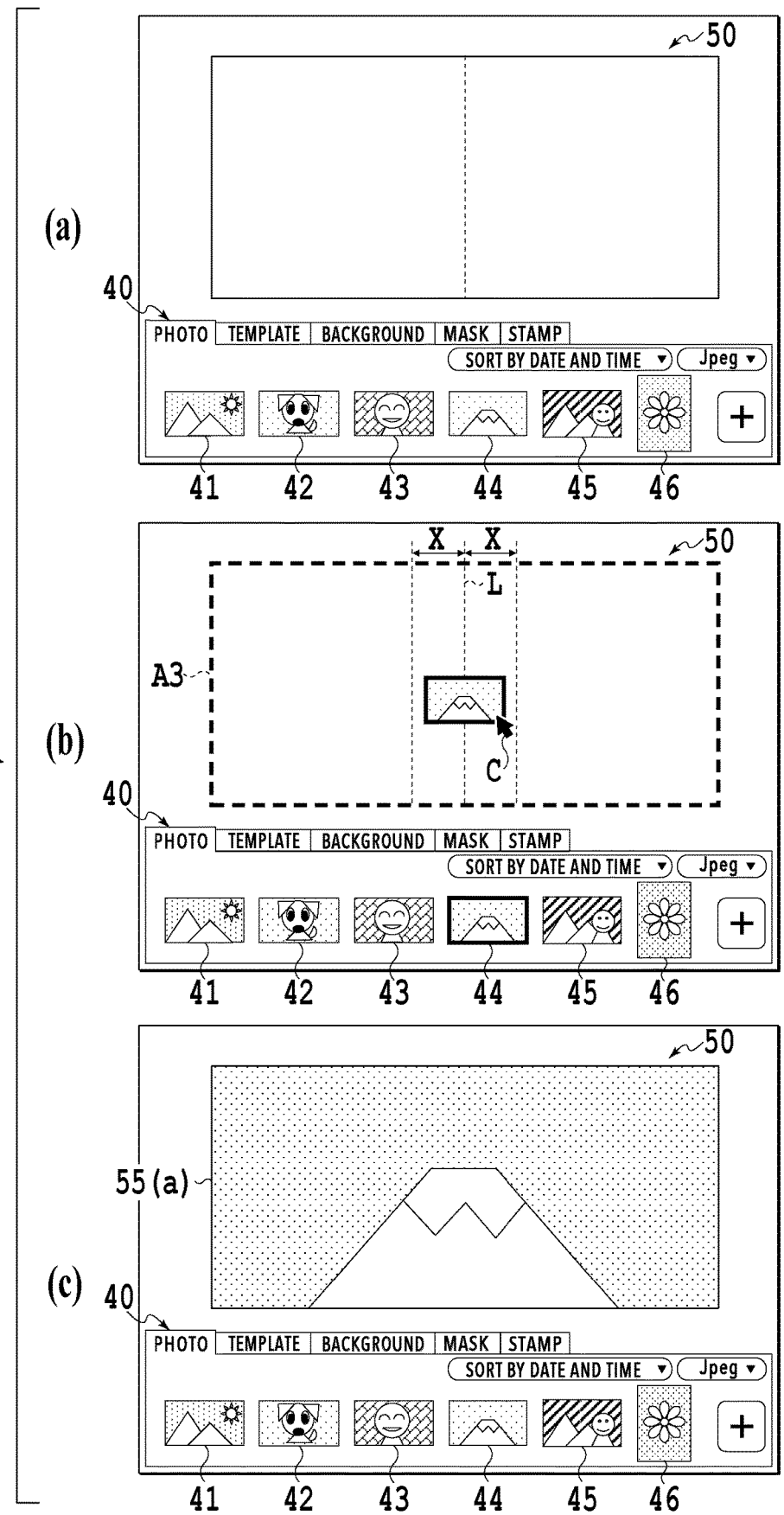

Hereafter, a display control on an arrangement candidate region in the present embodiment will be described using FIG. 11A and FIG. 11B, as well as FIG. 12A and FIG. 12B. FIG. 11A and FIG. 11B are flowcharts showing the processing of the present embodiment, and FIG. 12A and FIG. 12B each shows editing screens of the present embodiment. Note that, each step of FIG. 11A and FIG. 11B is executed by the CPU 1011 reading and processing a program involved in the processing of the flowchart from a memory. In addition, a series of processing of the album editing application 90 is the same as that of the first embodiment (see FIG. 3), and thus the detailed description thereof will be omitted.

In the present embodiment, as shown in (a) of FIG. 12A, as an example of addition of an object, a case when an image is selected and added from the image selection region 40 in the state where no image is arranged in the double-page spread region 50 of the album will be described. Note that the technical idea of the present embodiment is not limited to the state where no image is arranged in the double-page spread region 50, but may be applied to the state where an image is arranged, as in the first embodiment or the second embodiment.

In the case when an instruction by the user regarding addition of an image from the image selection region 40 to the double-page spread region 50 is detected, image addition processing of FIG. 11A is started.

In S301, the CPU 1011 detects an aspect ratio of an object to be added. In the present embodiment, an aspect ratio of an image to be added from the image selection region 40 is detected. For example, in the case when the image 44 is added as shown in (b) of FIG. 12A, the aspect ratio of the image 44 is detected.

Subsequently, in S302, the CPU 1011 derives an arrangement candidate region corresponding to the object to be added, as a partial region within a predetermined region range. In the present embodiment, an arrangement candidate region for the image 44 in the double-page spread region 50 of the album is derived. An example of a specific deriving method will be described using FIG. 11B as well as the editing screens of FIG. 12A and FIG. 12B.

In S3021, in the case when there is an existing object which have already been arranged, the CPU 1011 derives the position of the existing object. In the present embodiment, the position of an image region for an image present in the double-page spread region 50 is derived. Note that, since there is no image as an existing object in the editing screen of (a) of FIG. 12A, there is no position information on an image obtained in this step.

Next, in S3022, the CPU 1011 derives a blank region in which no existing object has been arranged as a partial region within the predetermined region range. In the present embodiment, a blank region in the double-page spread region 50 is derived.

Subsequently, in S3023, the CPU 1011 derives an arrangement candidate region A3 expanding across the double-page spread as shown in (b) of FIG. 12A. Specifically, information for displaying a slot frame of a double-page spread is generated.

Next, in S3024, the CPU 1011 derives an arrangement candidate region A4 corresponding to the left page as shown in (a) of FIG. 12B. Specifically, information for displaying a slot frame of the left page is generated.

Moreover, in S3025, the CPU 1011 derives an arrangement candidate region (not shown) corresponding to the right page, and ends the processing of deriving an arrangement candidate region. Specifically, information for displaying a slot frame of the right page is generated. After this step, the CPU 1011 proceeds to S303.

In S303, the CPU 1011 detects coordinates as position information on the cursor C operated by the user to add an image.

In S304, the CPU 1011 switches and displays an arrangement candidate region in conformity with the position of the cursor. Specifically, as shown in (b) of FIG. 12A, in the case when it is determined that the cursor C is present within a range of a predetermined distance (supposed to be X mm) symmetrically from the center line L of the double-page spread region 50 based on the coordinates of the cursor C, the CPU 1011 displays the arrangement candidate region A3 expanding across the double-page spread. Note that X may be set as desired, and, for example, it is supposed that X=50 mm. In addition, as shown in (a) of FIG. 12B, in the case when it is determined that the cursor C is present within a range of X mm or more away to the left from the center line L of the double-page spread region 50 based on the coordinates of the cursor C, the CPU 1011 displays the arrangement candidate region A4 for arrangement on the left page. Moreover, in the case when it is determined that the cursor C is present within a range of X mm or more away to the right from the center line L of the double-page spread region 50 based on the coordinates of the cursor C, the CPU 1011 displays an arrangement candidate region for arrangement on the right page.

Subsequently, in S305, the CPU 1011 determines whether the image has been dropped in the arrangement candidate region. Note that, in the present embodiment, the coordinates of the cursor C are used as a reference for determining the drop position.

If the result of the determination in S305 is true, in S306, the CPU 1011 arranges the image, which is the object to be added, in conformity with the arrangement candidate region. For example, as shown in (b) of FIG. 12A, in the case when the dropping processing is detected in the state where the cursor C is placed within the range of X mm symmetrically from the center line L of the double-page spread region 50, the image is arranged as indicated by an image 55(a) in (c) of FIG. 12A in conformity with the arrangement candidate region A3. In addition, as shown in (a) of FIG. 12B, in the case when the dropping processing is detected in the state where the cursor C is X mm or more away to the left from the center line L of the double-page spread region 50, the image is arranged as indicated by an image 55(b) in (b) of FIG. 12B in conformity with the arrangement candidate region A4. That is, the displayed arrangement candidate region and the arrangement of an image at the time of dropping are switched in accordance with the coordinates of the cursor C at the time of adding an image.

On the other hand, if the result of the determination in S305 is false, the CPU 1011 proceeds to S307. In the case when the image has not been dropped in the arrangement candidate region, in S307, the CPU 1011 arranges the image at any position at the time of dropping in accordance with a predetermined size that is set in advance. Since this processing is the same as the processing of S106 in the first embodiment, the detailed description thereof will be omitted.

Once the processing of adding an image is completed, the processing of the flowchart of FIG. 11A ends. The flow of the series of the processing of the present embodiment is as described above.

Advantageous Effects of the Present Embodiment

As described above, in the present embodiment, the arrangement candidate region is switched and displayed, or the arrangement of an image at the time of dropping is switched based on the coordinates of the cursor C at the time of adding an image. This makes it possible to efficiently achieve a layout having high aesthetic property in accordance with a simple operation at the time of adding an image, and to improve the convenience for the user at the time of editing work.

Fourth Embodiment

Hereafter, a fourth embodiment will be described. In the third embodiment, one arrangement candidate region with respect to specific one region is derived and displayed. In contrast, in the present embodiment, a plurality of arrangement candidate regions with respect to the same region are derived and displayed, and the display of the arrangement candidate regions is switched in accordance with the position of the cursor and the aspect ratio of an image.

<Display Control on Arrangement Candidate Regions for Additional Object in Accordance with Layout Condition>

Hereafter, a display control on an arrangement candidate region in the present embodiment will be described using FIG. 13A and FIG. 13B as well as FIG. 14A and FIG. 14B. FIG. 13A and FIG. 13B are flowcharts showing the processing of the present embodiment, and FIG. 14A and FIG. 14B each shows editing screens of the present embodiment. Note that, each step of FIG. 13A and FIG. 13B is executed by the CPU 1011 reading and processing a program involved in the processing of the flowchart from a memory. In addition, a series of processing of the album editing application 90 is the same as that of the first embodiment (see FIG. 3), and, thus, the detailed description thereof will be omitted.

In the present embodiment, as shown in (a) of FIG. 14A, as an example of addition of an object, a case when an image is added from the image selection region 40 in the state where no image is arranged in the double-page spread region 50 of the album will be described. Note that the present embodiment is not limited to the state where no image is arranged in the double-page spread region 50, but may be applied to the state where an image is arranged as in the first embodiment or the second embodiment.

In the case when an instruction by the user regarding addition of an image from the image selection region 40 to the double-page spread region 50 is detected, image addition processing of FIG. 13A is started.

In S401, the CPU 1011 detects an aspect ratio of an object to be added. In the present embodiment, an aspect ratio of an image to be added from the image selection region 40 is detected. For example, in the case when the image 46 is added as shown in (b) of FIG. 14A, the aspect ratio of the image 46 is detected.

Subsequently, in S402, the CPU 1011 derives an arrangement candidate region for arranging the object to be added, as a partial region within a predetermined region range. In the present embodiment, an arrangement candidate region for the image 46 in the double-page spread region 50 of the album is derived. An example of a specific deriving method will be described using FIG. 13B and the editing screen of (b) of FIG. 14A.

In S4021, in the case when there is an existing object which has already been arranged, the CPU 1011 derives position information on the existing object. In the present embodiment, the position of an image region for an image present in the double-page spread region 50 is derived. Note that, since there is no image as an existing object in the editing screen of (b) of FIG. 14A, there is no position information on an image obtained in this step.

Next, in S4022, the CPU 1011 derives a blank region in which no existing object has been arranged as a partial region within the predetermined region range. In the present embodiment, a blank region in the double-page spread region 50 is derived.

Subsequently, in S4023, the CPU 1011 derives a portrait (vertically long) arrangement candidate region A5 as shown in (b) of FIG. 14A.

Figure 14A:
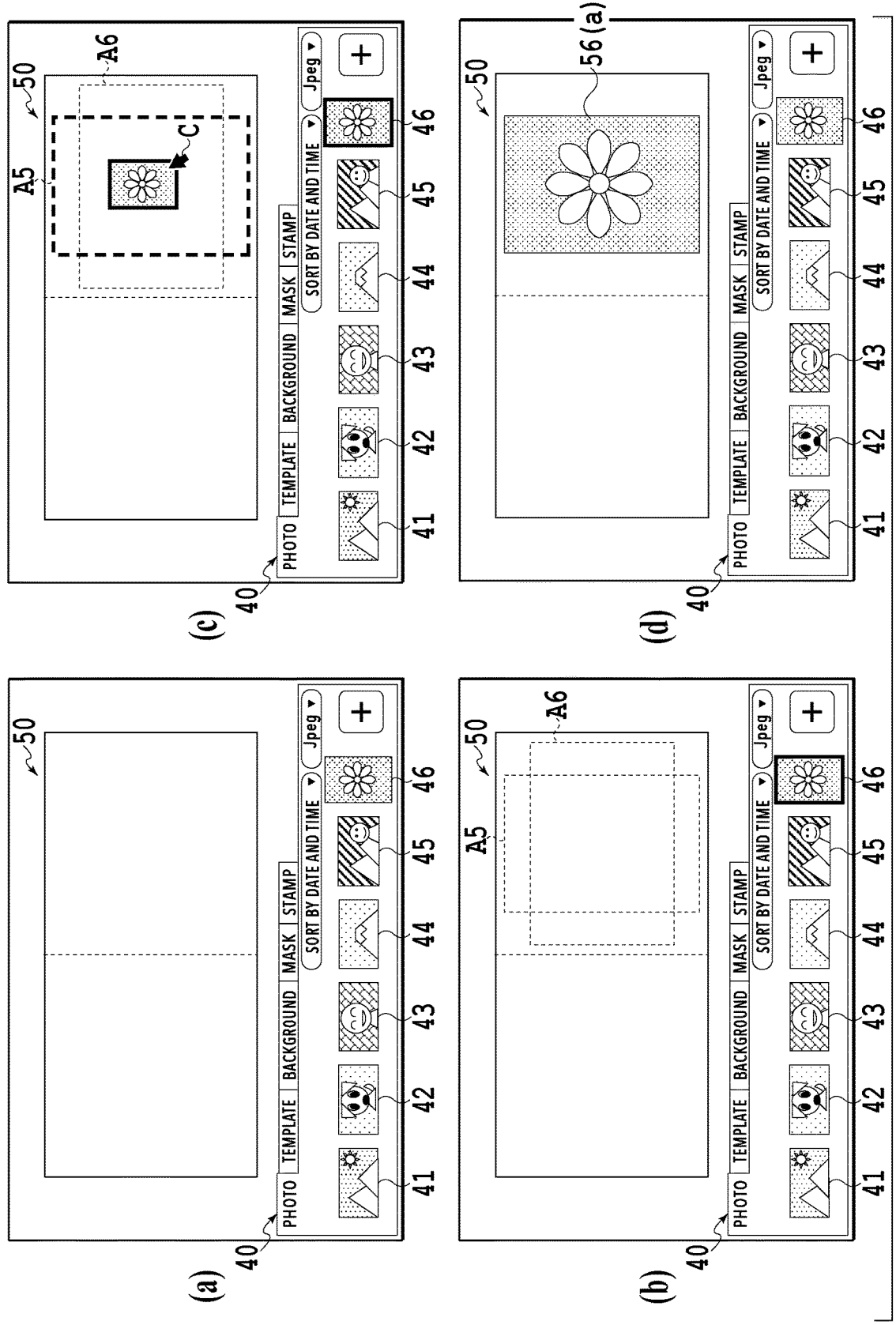
FIG. 14A and FIG. 14B are diagrams showing the editing screen.
Figure 14B:
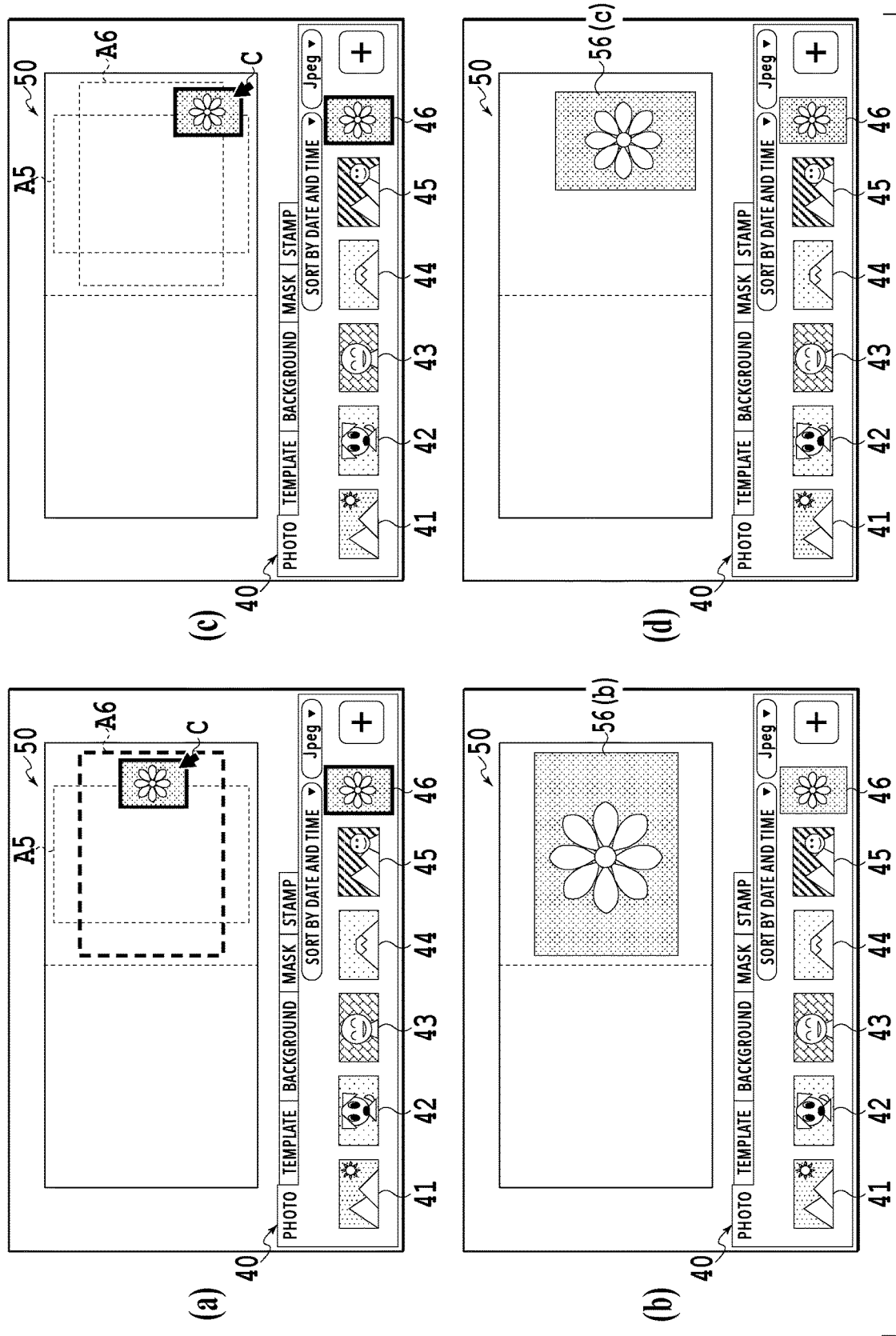

Next, in S4024, the CPU 1011 derives a landscape (horizontally long) arrangement candidate region A6 as shown in (b) of FIG. 14A, and ends the processing of deriving an arrangement candidate region. After this step, the CPU 1011 proceeds to S403.

In S403, the CPU 1011 displays the arrangement candidate region A5 and the arrangement candidate region A6 in the same region (the right page) as a plurality of arrangement candidate regions having different shapes.

In S404, the CPU 1011 detects coordinates as position information on the cursor C operated by the user to add an image.

In S405, the CPU 1011 displays, with emphasis, an arrangement candidate region in conformity with the position of the cursor. Specifically, as shown in (c) of FIG. 14A, in the case when it is determined that the cursor C is present within a range of the portrait (vertically long) arrangement candidate region A5 based on the coordinates of the cursor C, the CPU 1011 displays with emphasis the portrait (vertically long) arrangement candidate region A5. On the other hand, as shown in (a) of FIG. 14B, in the case when it is determined that the cursor C is present within a range of the landscape (horizontally long) arrangement candidate region A6 based on the coordinates of the cursor C, the CPU 1011 displays with emphasis the landscape (horizontally long) arrangement candidate region A6. Note that, although, in the present embodiment, the display with emphasis is made using the thickness of the frame line of the arrangement candidate region, the method for the display with emphasis is not limited to this, and another method may be employed.

Subsequently, in S406, the CPU 1011 determines whether the image has been dropped in the arrangement candidate region. Note that, in the present embodiment, the coordinates of the cursor C are used as a reference for determining the drop position.

If the result of the determination in S406 is true, in S407, the CPU 1011 determines whether the image has been dropped in a region where a plurality of arrangement candidate regions overlap. The region where a plurality of arrangement candidate regions overlap is, for example, a region near the center where the arrangement candidate region A5 and the arrangement candidate region A6 overlap in (b) of FIG. 14A.

If the result of the determination in S407 is true, in S408, the CPU 1011 arranges the image in conformity with an arrangement candidate region having an aspect ratio close to that of the image to be added. For example, as shown in (c) of FIG. 14A, in the case when a vertically long image 46 has been dropped in the region where the arrangement candidate region A5 and the arrangement candidate region A6 overlap, the CPU 1011 arranges the image 46 as indicated by an image 56(*a*) shown in (d) of FIG. 14A in conformity with the vertically long arrangement candidate region A5. That is, an appropriate arrangement candidate region is selected in accordance with the aspect ratio of the image to be added.

On the other hand, if the result of the determination in S407 is false, the CPU 1011 proceeds to S409. In the case when an image has not been dropped in a region where a plurality of arrangement candidate regions overlap, that is, in the case when an image has been dropped in specific one arrangement candidate region, in S409, the CPU 1011 arranges the image in conformity with the arrangement candidate region. For example, as shown in (a) of FIG. 14B, in the case when dropping processing is detected in the state where the cursor C is on the arrangement candidate region A6, the CPU 1011 arranges the image as indicated by an image 56(*b*) in (b) of FIG. 14B in conformity with the arrangement candidate region A6. Note that, in the present embodiment, since the aspect ratio of the image 46 and the aspect ratio of the arrangement candidate region A6 are different, the image 46 is trimmed and arranged.

If the result of the determination in S406 is false, the CPU 1011 proceeds to S410. In the case when the image has not been dropped in the arrangement candidate region, in S410, the CPU 1011 arranges the image at any position at the time of dropping in accordance with a predetermined size that is set in advance. For example, as shown in (c) of FIG. 14B, in the case when dropping processing of the image 46 is detected in the state when the cursor C is present outside the arrangement candidate region A5 or the arrangement candidate region A6, the CPU 1011 arranges the image 46 at any position, as indicated by an image 56(*c*) in (d) of FIG. 14B. In this case, the aspect ratio of the image is maintained.

Once the processing of adding an image is completed, the processing of the flowchart of FIG. 13A ends. The flow of the series of the processing of the present embodiment is as described above.

Advantageous Effects of the Present Embodiment

As described above, in the present embodiment, a plurality of arrangement candidate regions with respect to the same region are displayed, and the arrangement candidate regions to be displayed and the arrangement of the image at the time of dropping are switched in accordance with the position of the cursor and the aspect ratio of the image. This makes it possible to efficiently achieve a layout having high aesthetic property in accordance with the selection from a plurality of candidates at the time of adding an image and the aspect ratio of the image, and to improve the convenience for the user at the time of editing work.

Fifth Embodiment

Hereafter, a fifth embodiment will be described. The present embodiment has, in advance, setting information for switching display and non-display on an arrangement candidate region described in the aforementioned embodiments.
<Display Control on Arrangement Candidate Regions for Additional Object in Accordance with Layout Condition>

Figure 15:
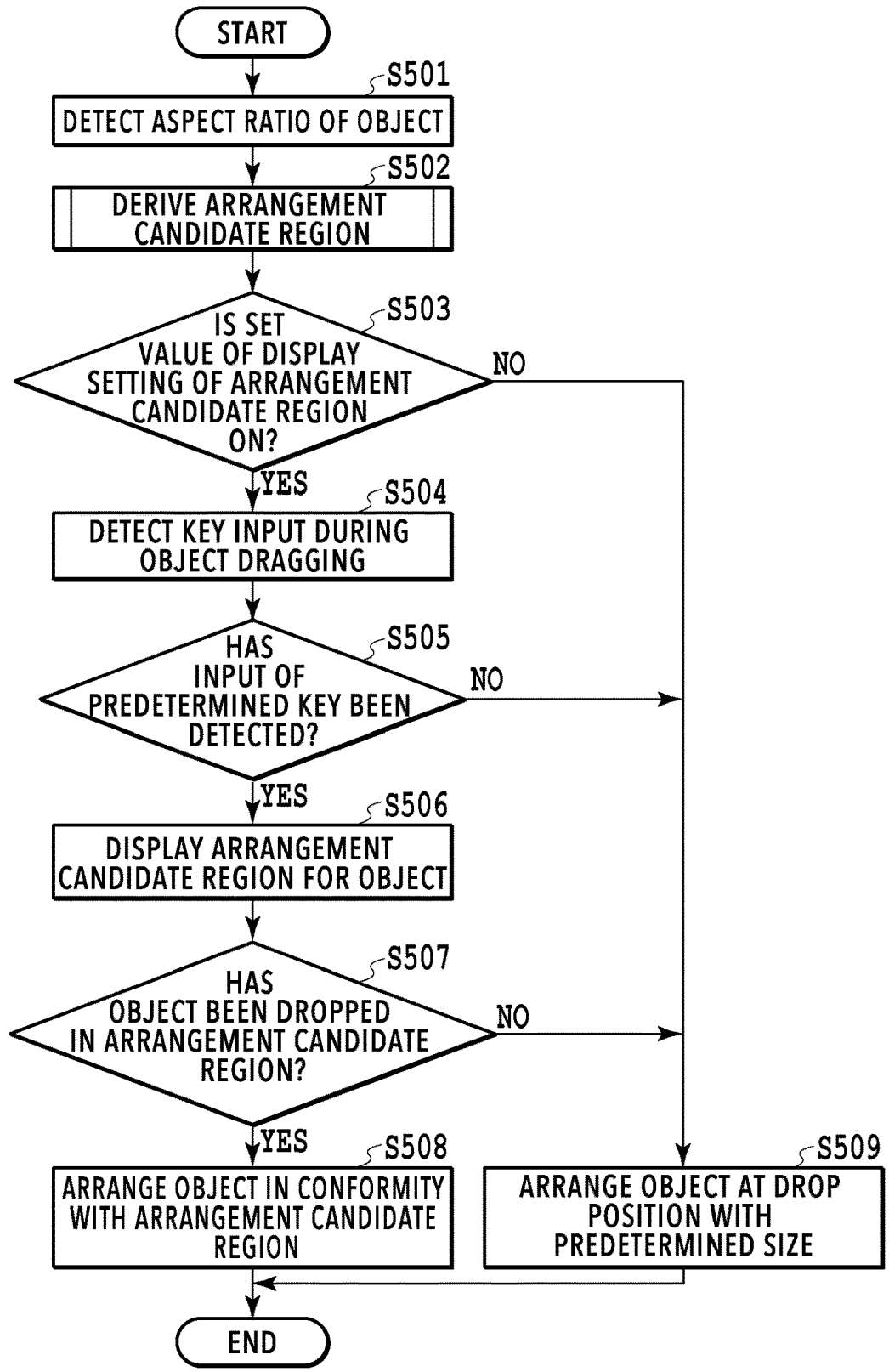
FIG. 15 is a flowchart of processing of adding an object.

Hereafter, a display control on an arrangement candidate region in the present embodiment will be described using FIG. 15 as well as FIG. 16A and FIG. 16B. FIG. 15 is a flowchart showing the processing of the present embodiment, and FIG. 16A and FIG. 16B each shows editing screens of the present embodiment. Note that each step of FIG. 15 is executed by the CPU 1011 reading and processing a program involved in the processing of the flowchart from a memory. In addition, a series of processing of the album editing application 90 is the same as that of the first embodiment (see FIG. 3), and, thus, the detailed description thereof will be omitted.

Figure 16A:
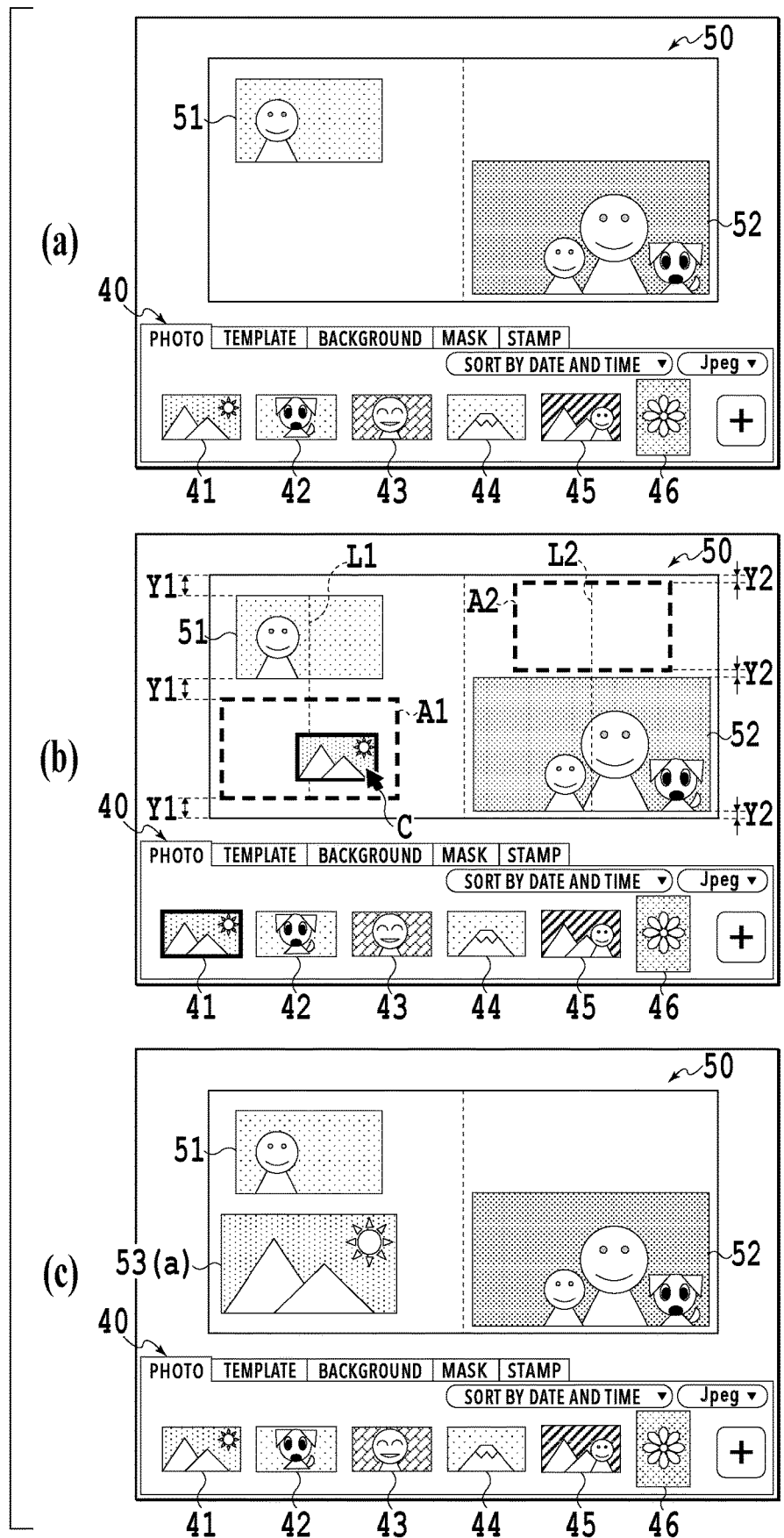
FIG. 16A and FIG. 16B are diagrams showing an editing screen.
Figure 16B:
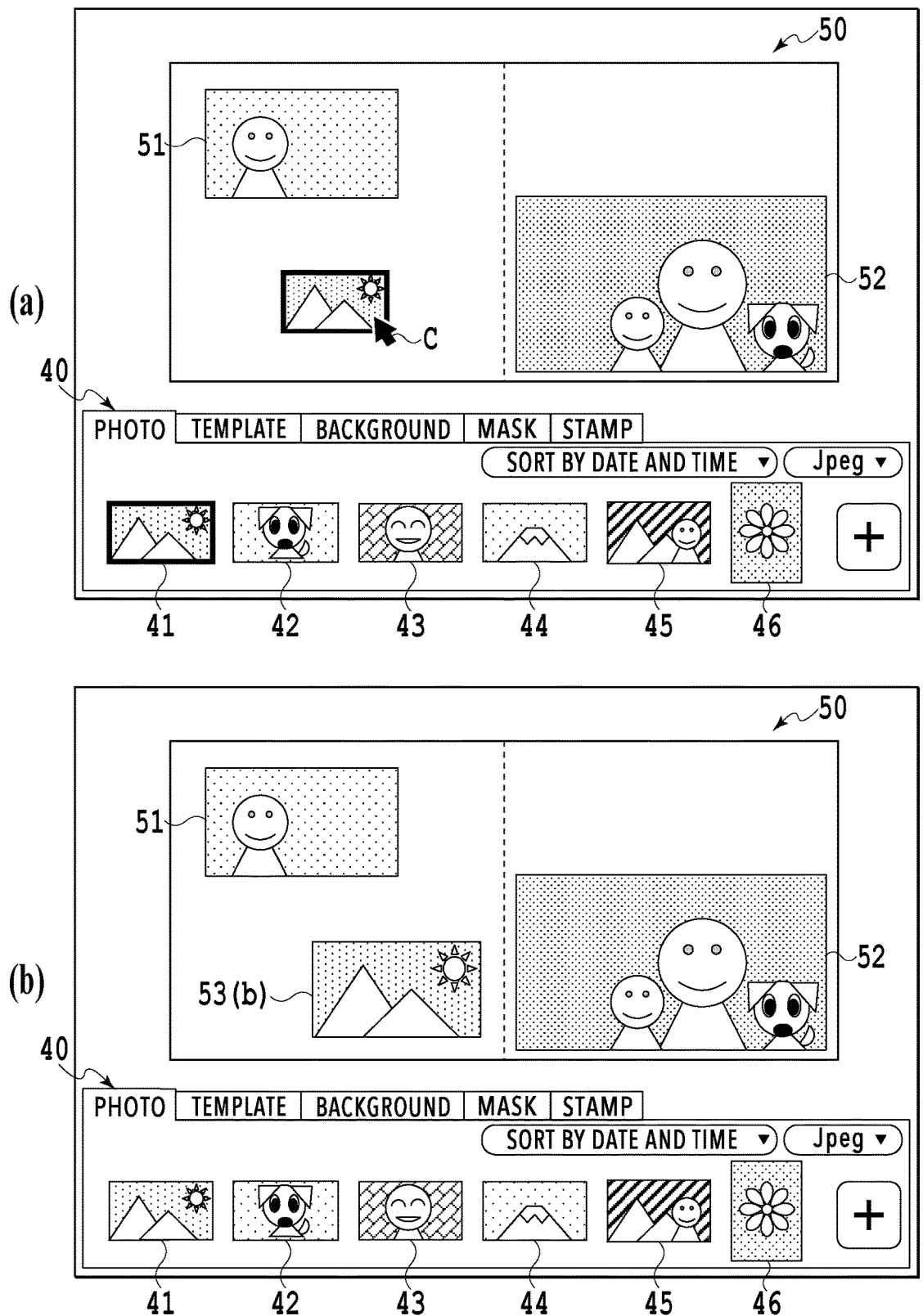

As shown in (a) of FIG. 16A, in the case when an instruction by the user regarding addition of an image from the image selection region 40 to the double-page spread region 50 is detected, image addition processing of FIG. 15 is started.

In S501, the CPU 1011 detects an aspect ratio of an object to be added. In the present embodiment, an aspect ratio of an image to be added from the image selection region 40 is detected.

Subsequently, in S502, the CPU 1011 derives an arrangement candidate region for arranging the object to be added, as a partial region within a predetermined region range. In the present embodiment, an arrangement candidate region for the image to be added in the double-page spread region 50 of the album is derived. Since the specific deriving method has already been described in the aforementioned embodiment, the detailed description thereof will be omitted.

Figure 6:
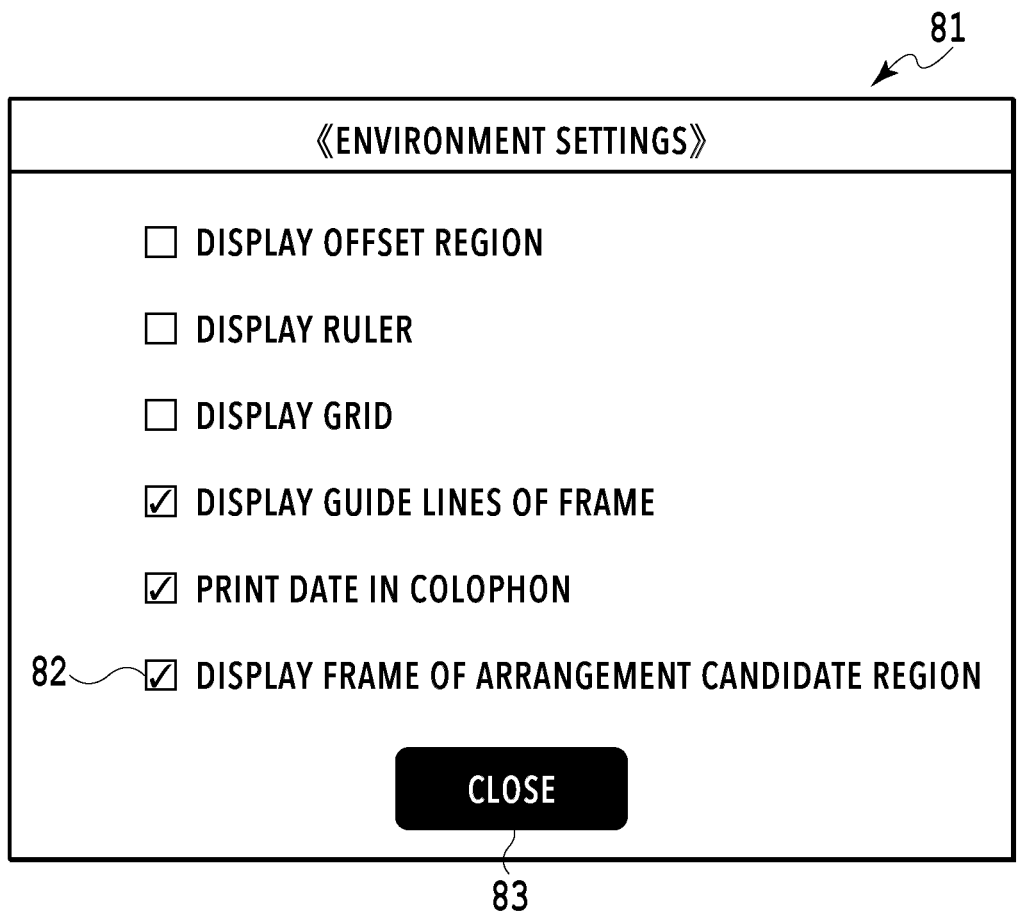
FIG. 6 is a diagram showing an environment setting screen.

In S503, the CPU 1011 determines whether a set value of display setting of an arrangement candidate region is ON. Specifically, the CPU 1011 determines whether a check box 82 for displaying an arrangement candidate region is ON in the environment setting screen 81 as shown in FIG. 6, which can be set in advance. If the result of the determination in this step is true, the CPU 1011 proceeds to S504.

In S504, the CPU 1011 detects whether any key has been pressed during drag for adding an image.

Subsequently, in S505, the CPU 1011 determines whether a predetermined key for switching the display of an arrangement candidate region has been pressed based on the result of the detection in S504. As the predetermined key, the Ctrl key, or the like, of the input apparatus 1007 is assigned, for example.

If the result of the determination in S505 is true, in S506, the CPU 1011 displays an arrangement candidate region A1 and an arrangement candidate region A2 for the image 41 as shown in (b) of FIG. 16A.

After S506, in S507, the CPU 1011 determines whether the image 41 has been dropped in the arrangement candidate region A1 or the arrangement candidate region A2. Note that, in the present embodiment, the coordinates of the cursor C are used as a reference for determining the drop position.

If the result of the determination in S507 is true, in S508, the CPU 1011 arranges, in the arrangement candidate region A1 or the arrangement candidate region A2, the image 41, which has been resized in conformity with the size of the arrangement candidate region. For example, as shown in (b) of FIG. 16A, in the case when dropping processing into the arrangement candidate region A1 is detected in the state where the cursor C is on the arrangement candidate region A1, the image 41 is arranged as indicated by an image 53(a) in (c) of FIG. 16A.

On the other hand, if the result of the determination in S507 is false, the CPU 1011 proceeds to S509. In the case when the image 41 has not been dropped in the arrangement candidate region A1 or the arrangement candidate region A2, in S509, the CPU 1011 arranges the image at any position at the time of dropping in accordance with a predetermined size that is set in advance. Since the processing in this step has already been described in the first embodiment, the detailed description thereof will be omitted.

In addition, if the result of the determination in S505 is false, the CPU 1011 proceeds to S509. That is, in the case when the predetermined key for switching the display of an arrangement candidate region has not been pressed during drag for adding an image, the CPU 1011 does not display an arrangement candidate region. For example, as shown in (a) of FIG. 16B, an arrangement candidate region is not displayed while the image 41 is being moved. In addition, at the time of dropping into the double-page spread region 50, as an image 53(b) shown in (b) of FIG. 16B, the image is arranged at any position at the time of dropping in accordance with the predetermined size set in advance. In this way, display or non-display of an arrangement candidate region can be switched based on whether or not the predetermined key has been pressed together during drag for adding an image.

In addition, if the result of the determination on whether the set value of display setting of an arrangement candidate region in S503 is false, the CPU 1011 proceeds to S509. That is, in the case where the display of an arrangement candidate region is unnecessary, the function of displaying an arrangement candidate region is not used, and an image can be arranged at any position.

Once the processing of adding an image is completed, the processing of the flowchart of FIG. 15 ends. The flow of the series of the processing of the present embodiment is as described above.

Advantageous Effects of the Present Embodiment

As described above, in the present embodiment, display and non-display of an arrangement candidate region are switched by the display setting of an arrangement candidate region or pressing the predetermined key. This makes it possible to efficiently achieve a layout having high aesthetic property by utilizing an arrangement candidate region only when necessary, and to improve the convenience for the user at the time of editing work.

Other Embodiments

The album editing application 90 may have some or all functions of the functions of the aforementioned five embodiments.

In addition, although the aforementioned embodiments have been described as being executed by using the album editing application 90, an application to which the idea of the present disclosure can be applied is not limited to an album editing application. For example, the idea of the present disclosure can be applied to layout software in general such as a layout editing application, a poster production application, and presentation preparation software that newly arrange object data.

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

The present disclosure makes it possible to improve convenience in a case where a user is conducting a layout operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A non-transitory computer readable storage medium storing a program that causes a computer to execute an information processing method comprising:
    a displaying step of displaying a graphical user interface having a first region in which to arrange an object and a second region in which to display a list of an object that can be arranged in the first region, wherein the first region is a region of a double-page spread of an album, the region of the double-page spread including a region of a left page and a region of a right page; and
    a deriving step of deriving a candidate region in which to arrange an object selected by a user in the first region, based on a state of arrangement of an object other than the selected object in the first region,
    wherein the candidate region is displayed as a rectangular frame surrounded by a dashed line in the first region,
    in a case of moving the selected object in the first region, the candidate region is switched and displayed based on a position of a cursor indicating the selected object,
    in a case when the cursor is present within a range of a predetermined distance from a center line of the region of the double-page spread, a first candidate region corresponding to the double-page spread is displayed in the first region,
    in a case when the cursor is present not within the range of the predetermined distance from the center line of the region of the double-page spread, but within the region of the left page, a second candidate region corresponding to the left page is displayed in the first region, and
    in a case when the cursor is present not within the range of the predetermined distance from the center line of the region of the double-page spread, but within the region of the right page, a third candidate region corresponding to the right page is displayed in the first region.

2. The storage medium according to claim 1, wherein the selected object is an object selected from the second region, and
    the information processing method further comprises a second displaying step of displaying the candidate region derived in the deriving step in the first region.

3. The storage medium according to claim 1, wherein the candidate region is derived in a case when the user has conducted an editing operation in the first region.

4. The storage medium according to claim 3, wherein the editing operation is addition of a new object from the second region, or movement of an existing object that has been selected from the second region and already arranged in the first region.

5. The storage medium according to claim 4, wherein the selected object is arranged while being resized in conformity with the candidate region when being dropped into the candidate region.

6. The storage medium according to claim 4, wherein, in a case when the selected object is dropped in a state when a cursor is present outside the candidate region, the selected object is arranged at any position containing at least a position of the cursor.

7. The storage medium according to claim 4, wherein, in deriving the candidate region, in a case when the existing object is present, a center line of the derived candidate region complies with a center line of the existing object, and a margin width of the derived candidate region is uniform with a margin width of the existing object.

8. The storage medium according to claim 1, wherein a plurality of candidate regions is derived as the candidate region, and the plurality of candidate regions is displayed in the first region.

9. The storage medium according to claim 1, wherein a preview of an object during a drag operation is displayed together in the candidate region, the object being the selected object.

10. The storage medium according to claim 8, wherein, in a case when the plurality of candidate regions is displayed in the first region, the selected object is arranged in one of the candidate regions based on a position of a cursor at the time of dropping.

11. The storage medium according to claim 10, wherein, in a case when there are a plurality of the candidate regions corresponding to the position of the cursor at the time of dropping, the selected object is arranged in a candidate region having an aspect ratio close to that of the selected object among the plurality of candidate regions.

12. The storage medium according to claim 1, wherein whether or not to display the candidate region derived in the deriving step in the first region can be set.

13. An image processing apparatus comprising:
a display control unit that displays a graphical user interface having a first region in which to arrange an object and a second region in which to display a list of an object that can be arranged in the first region, wherein the first region is a region of a double-page spread of an album, the region of the double-page spread including a region of a left page and a region of a right page; and
a deriving unit that derives a candidate region in which to arrange an object selected by a user in the first region, based on a state of arrangement of an object other than the selected object in the first region,
wherein the candidate region is displayed as a rectangular frame surrounded by a dashed line in the first region,
in a case of moving the selected object in the first region, the candidate region is switched and displayed based on a position of a cursor indicating the selected object,
in a case when the cursor is present within a range of a predetermined distance from a center line of the region of the double-page spread, a first candidate region corresponding to the double-page spread is displayed in the first region,
in a case when the cursor is present not within the range of the predetermined distance from the center line of the region of the double-page spread, but within the region of the left page, a second candidate region corresponding to the left page is displayed in the first region, and
in a case when the cursor is present not within the range of the predetermined distance from the center line of the region of the double-page spread, but within the region of the right page, a third candidate region corresponding to the right page is displayed in the first region.

14. An information processing method comprising:
a displaying step of displaying a graphical user interface having a first region in which to arrange an object and a second region in which to display a list of an object that can be arranged in the first region, wherein the first region is a region of a double-page spread of an album, the region of the double-page spread including a region of a left page and a region of a right page; and
a deriving step of deriving a candidate region in which to arrange an object selected by a user in the first region, based on a state of arrangement of an object other than the selected object in the first region,
wherein the candidate region is displayed as a rectangular frame surrounded by a dashed line in the first region,
in a case of moving the selected object in the first region, the candidate region is switched and displayed based on a position of a cursor indicating the selected object,
in a case when the cursor is present within a range of a predetermined distance from a center line of the region of the double-page spread, a first candidate region corresponding to the double-page spread is displayed in the first region,
in a case when the cursor is present not within the range of the predetermined distance from the center line of the region of the double-page spread, but within the region of the left page, a second candidate region corresponding to the left page is displayed in the first region, and
in a case when the cursor is present not within the range of the predetermined distance from the center line of the region of the double-page spread, but within the region of the right page, a third candidate region corresponding to the right page is displayed in the first region.

* * * * *